United States Patent
Noguchi

(10) Patent No.: US 11,621,654 B2
(45) Date of Patent: Apr. 4, 2023

(54) VIBRATION-WAVE MOTOR AND APPARATUS USING THE SAME

(71) Applicant: CANON KABUSHIKI KAISHA, Tokyo (JP)

(72) Inventor: Kazuhiro Noguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1358 days.

(21) Appl. No.: 15/848,838

(22) Filed: Dec. 20, 2017

(65) Prior Publication Data

US 2018/0183355 A1    Jun. 28, 2018

(30) Foreign Application Priority Data

Dec. 22, 2016  (JP) .............................. JP2016-248601

(51) Int. Cl.
*G02B 7/08* (2021.01)
*H02N 2/00* (2006.01)
*H02N 2/02* (2006.01)

(52) U.S. Cl.
CPC ............. *H02N 2/0095* (2013.01); *G02B 7/08* (2013.01); *H02N 2/001* (2013.01); *H02N 2/006* (2013.01); *H02N 2/0055* (2013.01); *H02N 2/026* (2013.01)

(58) Field of Classification Search
CPC ...... H02N 2/0095; H02N 2/006; H02N 2/026; H02N 2/001; G02B 7/08
See application file for complete search history.

(56) References Cited

U.S. PATENT DOCUMENTS

| 9,219,429 B2 * | 12/2015 | Yamanaka ............. H02N 2/043 |
| 9,660,556 B2 * | 5/2017 | Yamamoto ............. H02N 2/026 |
| 10,734,923 B2 * | 8/2020 | Yamamoto ............... G02B 7/08 |
| 2015/0183001 A1 | 7/2015 | Yamamoto |

FOREIGN PATENT DOCUMENTS

| JP | 2015104140 A | 6/2015 |
| JP | 2015220911 A | 12/2015 |
| JP | 5969976 B2 | 8/2016 |

* cited by examiner

*Primary Examiner* — Shawki S Ismail
*Assistant Examiner* — Karen B Addison
(74) *Attorney, Agent, or Firm* — Rossi, Kimms & McDowell LLP

(57) ABSTRACT

A vibration-wave motor includes a vibrator having two protruding parts, a holding member configured to hold the vibrator, a movable member configured to translationally move together with the holding member, a rotating unit configured to allow the holding member to rotate around each of three axes relative to the movable member and to restrict the holding member from translating in each of the three axes relative to the movable member, a urging member configured to urge the holding member and the movable member so that the holding member and the movable member translationally move together, and a restricting unit configured to restrict the holding member from rotating around the rotating unit as a center by the urging member.

10 Claims, 17 Drawing Sheets

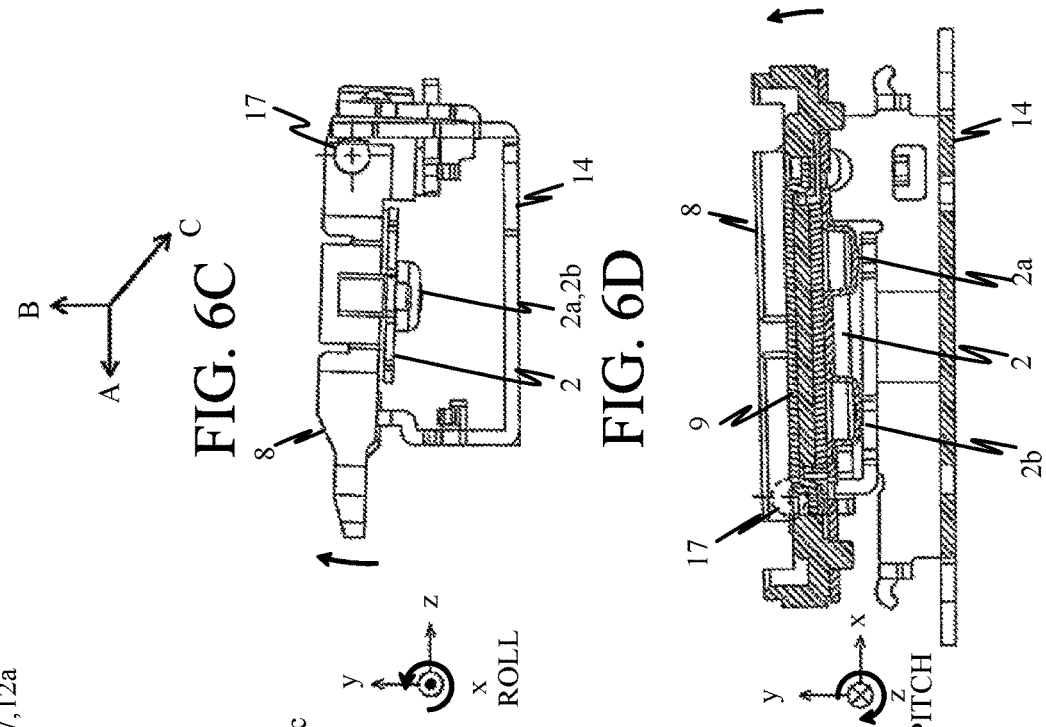
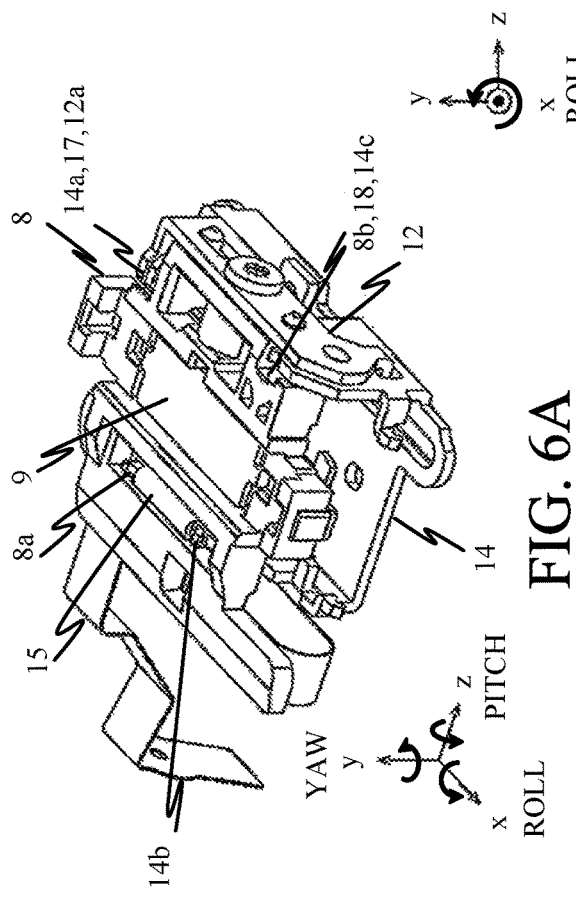
FIG. 6A
FIG. 6B
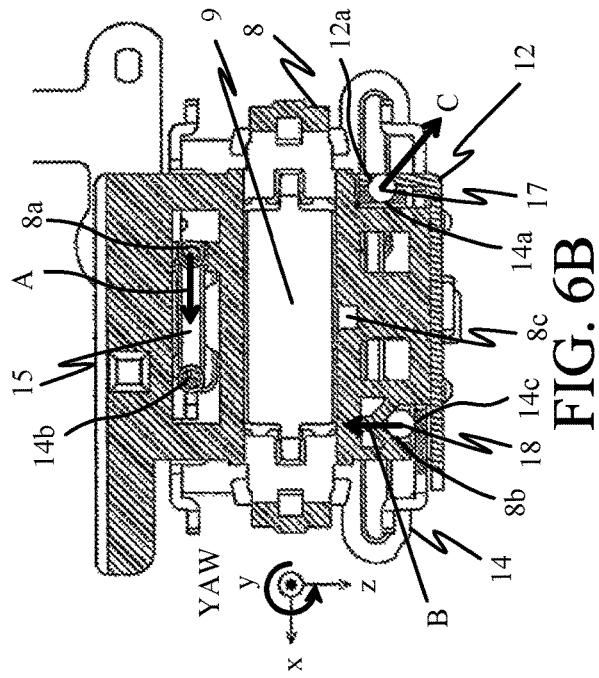
FIG. 6C
FIG. 6D
FIG. 6E

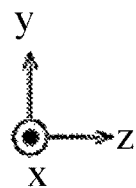
FIG. 9A
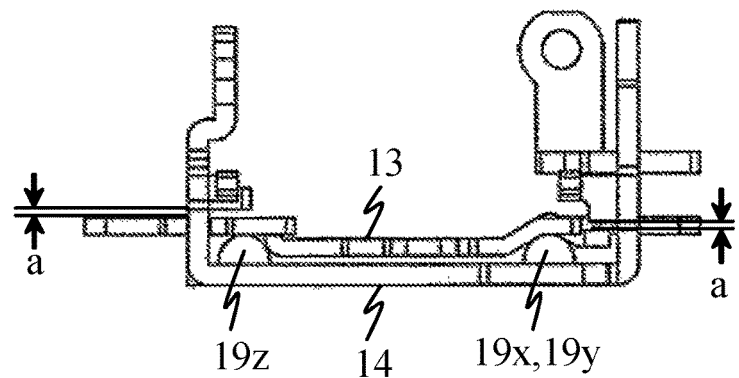
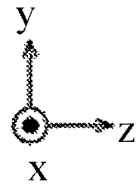
FIG. 9B
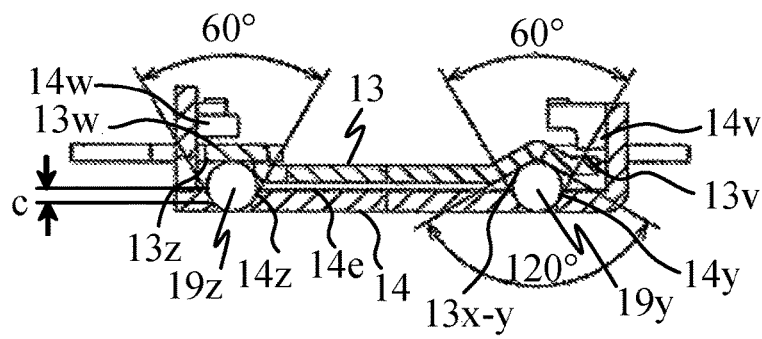
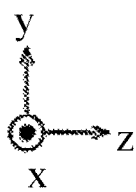
FIG. 9C
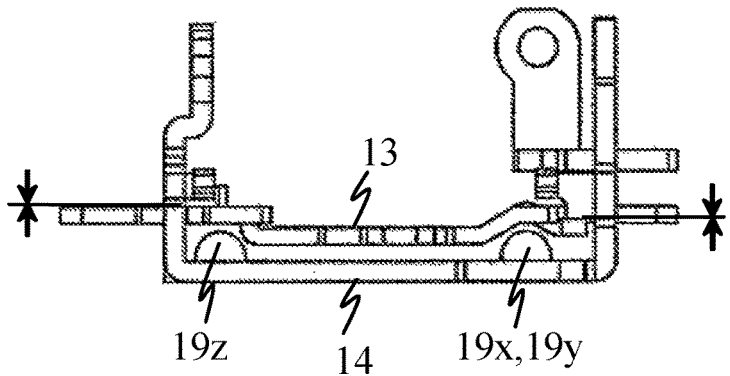
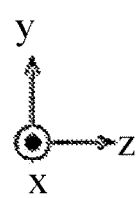
FIG. 9D
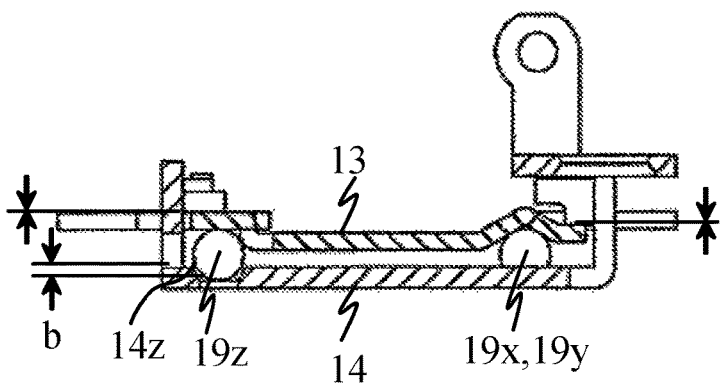

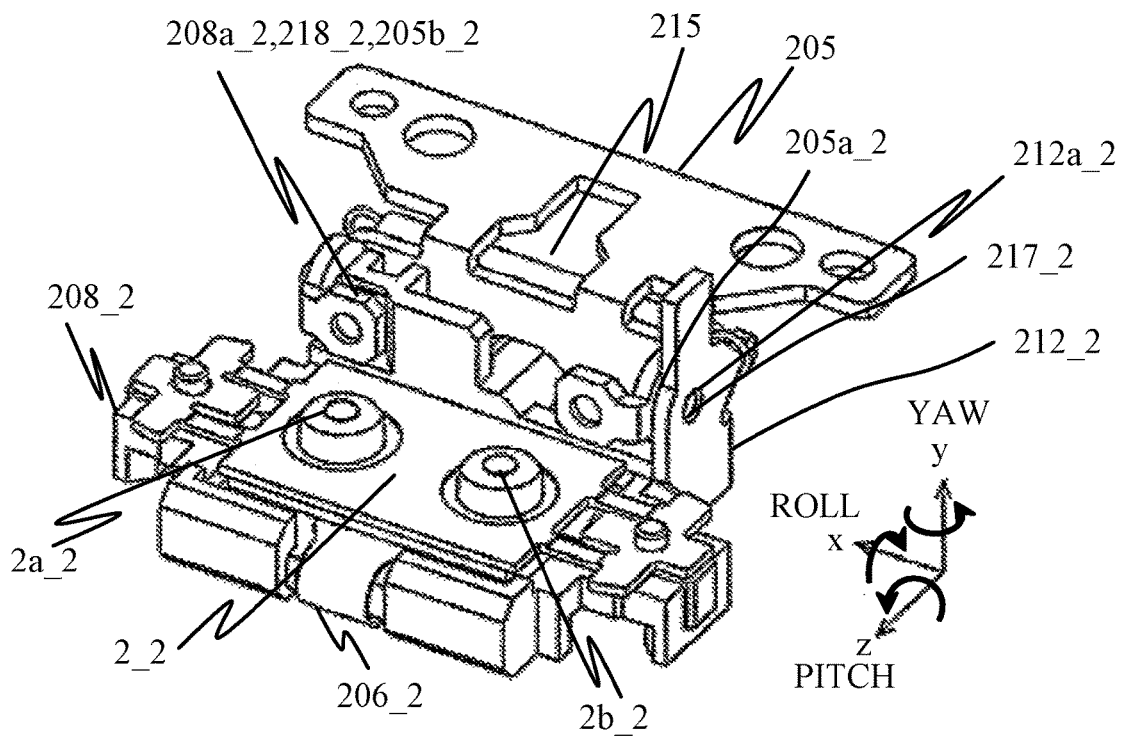
FIG. 15A
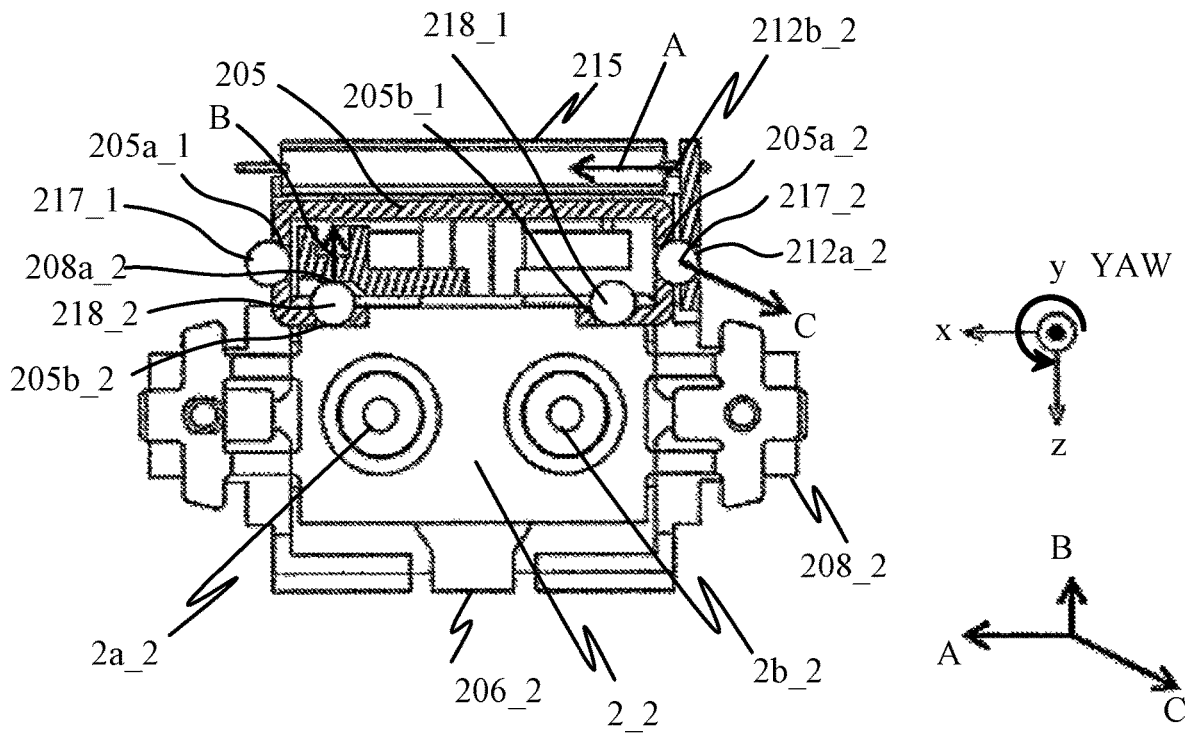
FIG. 15B
FIG. 15C

VIBRATION-WAVE MOTOR AND APPARATUS USING THE SAME

BACKGROUND OF THE INVENTION

Field of the Invention

The present invention relates to a vibration-wave motor and an apparatus using the same.

Description of the Related Art

A friction drive type vibration-wave motor (ultrasonic motor) that acquires a driving force from a deformation in a piezoelectric effect of a piezoelectric effect can generate a power larger than that of an electromagnetic motor and drive a driven member without a speed reducing mechanism. In addition, this motor drives the driven member by using the friction, and thus can provide a large retention force and sufficient quietness during driving.

The frictional driving type vibration-wave motor includes a vibrator that includes a vibration plate having a pressing part and a piezoelectric element, and a driven member that compressively contacts a protruding part. The vibration-wave motor can exhibit a desired performance by maintaining a predetermined value for the pressing force against the pressing part. Although a large pressing force increases a generated power, a driving vibration of the vibrator is restrained. Thus, the consumption power increases for the same speed and the electromechanical conversion efficiency lowers. On the other hand, a small pressing force decreases the generated power. In particular, where two pressing parts provide unbalanced pressing forces, deformations that should be symmetrical with respect to the driving direction become asymmetrical, the conversion efficiency lowers, and differences in the driving direction among a variety of characteristics increase.

Japanese Patents No. 5969976 discloses a vibration-wave motor in which a vibrator fixed base is integrated with a vibrator supporting member for holding the base through a coupling member in the driving direction. Since the vibrator is pressed against the sliding member in the vibrator supporting member, the contact state is stable between the vibrator and the sliding member.

According to an ultrasonic motor disclosed in Japanese Patent Laid-Open No. 2015-220911, first and third holding members hold a vibrator via a second holding member. When the second holding member as a thin flat spring is high rigid and the vibrator is low rigid in the pressing direction of the friction member, the contact state becomes stable between the vibrator and the friction member.

In the vibration-wave motor disclosed in Japanese Patent No. 5969976, the base and the vibrator supporting member have a double structure in the plane direction and may cause a larger size when a sufficient rigidity is sought.

In addition, in the ultrasonic motor disclosed in Japanese Patent Laid-Open No. 2015-220911, the first and third holding members for holding the vibrator have a double structure in the plane direction so as to provide the second holding member as the thin flat spring with the above function and may cause a larger size when a sufficient rigidity is sought. Since the second holding member is coupled with the first holding member for holding the vibrator as a vibration source, unnecessary vibrations and noises may be occur due to the shape of the second holding member and the vibration mode.

SUMMARY OF THE INVENTION

The present invention provides a vibration-wave motor having a small size and a stable performance.

A vibration-wave motor according to one aspect of the present invention includes a vibrator having two protruding parts, a holding member configured to hold the vibrator, a movable member configured to translationally move together with the holding member, a rotating unit configured to allow the holding member to rotate around each of three axes relative to the movable member and to restrict the holding member from translating in each of the three axes relative to the movable member, a urging member configured to urge the holding member and the movable member so that the holding member and the movable member translationally move together, and a restricting unit configured to restrict the holding member from rotating around the rotating unit as a center by the urging member.

Further features of the present invention will become apparent from the following description of exemplary embodiments with reference to the attached drawings.

BRIEF DESCRIPTION OF THE DRAWINGS

FIGS. 6A, 6B, 6C, 6D, and 6E are explanatory views of degrees of freedom of motions in the vibrator according to the first embodiment.

FIGS. 9A, 9B, 9C, and 9D are explanatory views of the linear guide part according to the first embodiment.

FIGS. 15A, 15B, and 15C are explanatory views of the degrees of freedom of motions in the vibrator according to the second embodiment.

DESCRIPTION OF THE EMBODIMENTS

Figure 1:
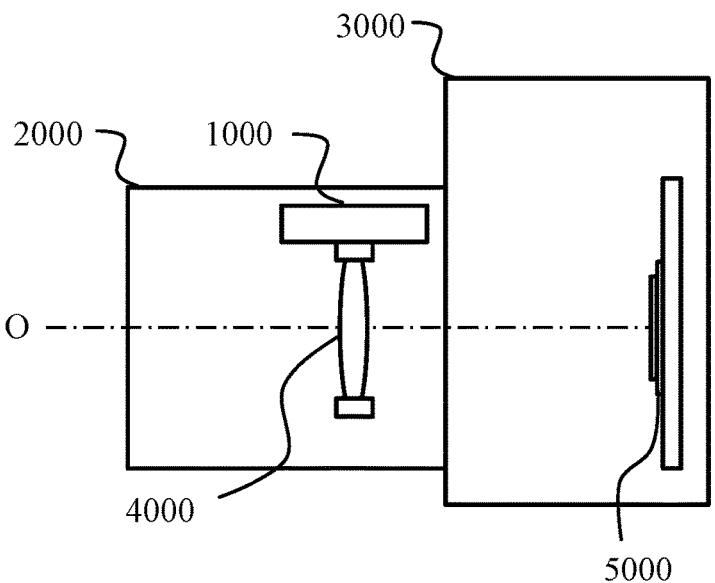
FIG. 1 is a sectional view of an image pickup apparatus having a vibration-wave motor unit according to embodiments of the present invention.

Referring now to the accompanying drawings, a detailed description will be given of embodiments of the present invention. In each figure, the same element will be designated by the same reference numeral, and a duplicate description thereof will be omitted.

FIG. 1 is a sectional view of an image pickup apparatus (optical apparatus) that includes a vibration-wave motor unit (vibration-wave motor or ultrasonic motor unit, referred to as a "motor unit" hereinafter) 1000 according to the embodiments of the present invention. The image pickup apparatus according to the embodiments includes an image pickup lens unit 2000 and a camera body 3000. The image pickup lens unit 2000 includes the motor unit 1000, and a focusing lens 4000 attached to the motor unit 1000. The camera body 3000 includes an image pickup element 5000. The focusing lens 4000 is moved along an optical axis O by the motor unit 1000. An object image is formed at a position of the image pickup element 5000, which, in turn, generates a focused image. While this embodiment mounts the motor unit 1000 into the image pickup apparatus, the present invention is not limited to this embodiment. The motor unit 1000 may be mounted into another optical apparatus, such as a lens unit, or an apparatus different from the optical apparatus. In this embodiment, the image pickup lens unit 2000 and the camera body 3000 are integrally configured but the present invention is not limited to this embodiment. The image pickup lens unit 2000 may be detachably attached to the camera body 3000. In other words, the apparatus in this embodiment means an apparatus that includes a vibration-wave motor described in the following embodiments and a member driven by a driving force from the vibration-wave motor.

First Embodiment

Figure 2A:
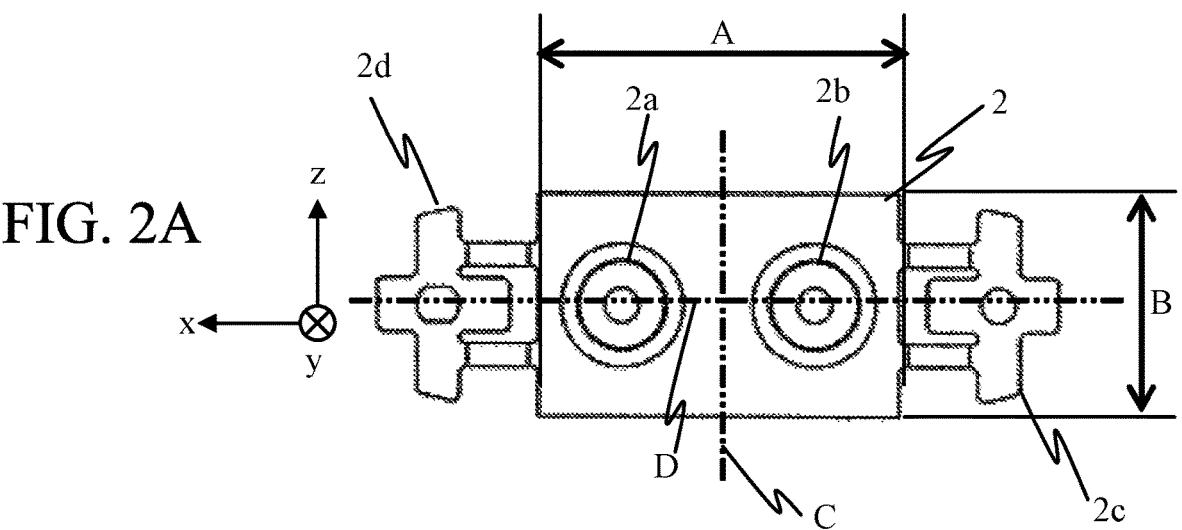
FIGS. 2A and 2B are plane and side views of a vibrator according to a first embodiment.
Figure 2B:
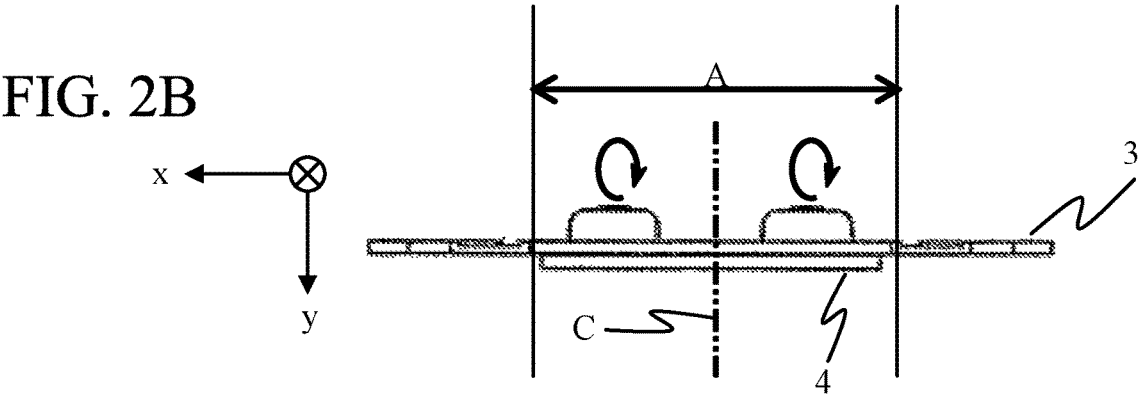

Referring now to FIGS. 2A and 2B, a description will be given of a vibrator 2 in the motor unit 1000A according to this embodiment. FIGS. 2A and 2B are plane and side views of the vibrator 2. FIG. 2A is a plane view of the vibrator 2, and FIG. 2B is its side view. The vibrator 2 includes protruding parts 2a and 2b, and fixed arms 2c and 2d. Vibration plates 3 and a piezoelectric element 4 are fixed onto the vibrator 2 by an adhesive agent etc. When a two-phase, high frequency voltage is applied to the piezoelectric element 4, the ultrasonic vibration is excited and elliptical motions are excited at tips of the driving projections 2a and 2b on the xy plane illustrated in FIG. 2B. When the protruding parts 2a and 2b frictionally contact a frictional material in this state, the vibrator 2 and the frictional material move relative to each other. This embodiment defines a driving force generating area (opposite area) as a rectangular area A×B that is opposite to a friction member 7 and includes the protruding parts 2a and 2b. A longitudinal symmetrical plane (first plane) is a surface C that is orthogonal to the rectangular area A×B and the x-axis and symmetrically divides the rectangular area A×B. A lateral symmetrical plane (second plane) is a surface D that is orthogonal to the rectangular area A×B and the z-axis and symmetrically divides the rectangular area A×B. The longitudinal symmetrical plane C is a plane that contains a direction orthogonal to both the moving direction of the following moving member and a pressing direction of a press member, and the pressing direction of the press member. The lateral symmetrical plane D is a plane that contains the moving direction of the moving unit and the pressing direction of the press member.

Figure 3A:
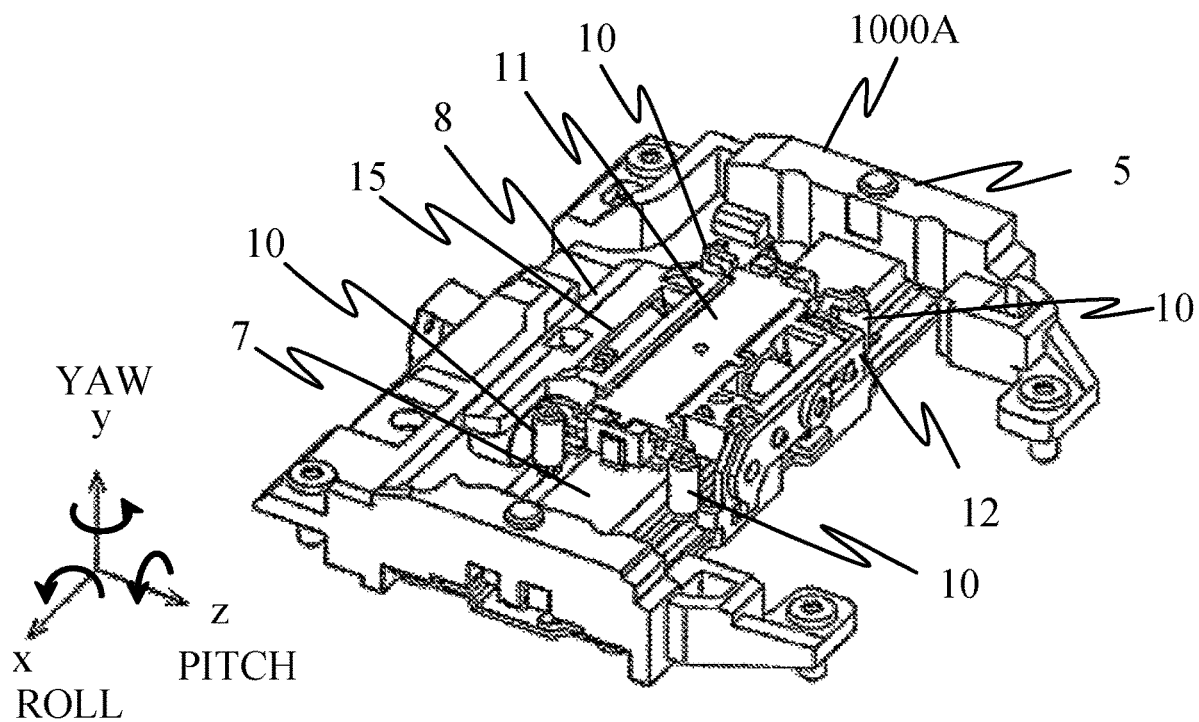
FIGS. 3A and 3B are perspective views of the vibration-wave motor unit according to the first embodiment.
Figure 3B:
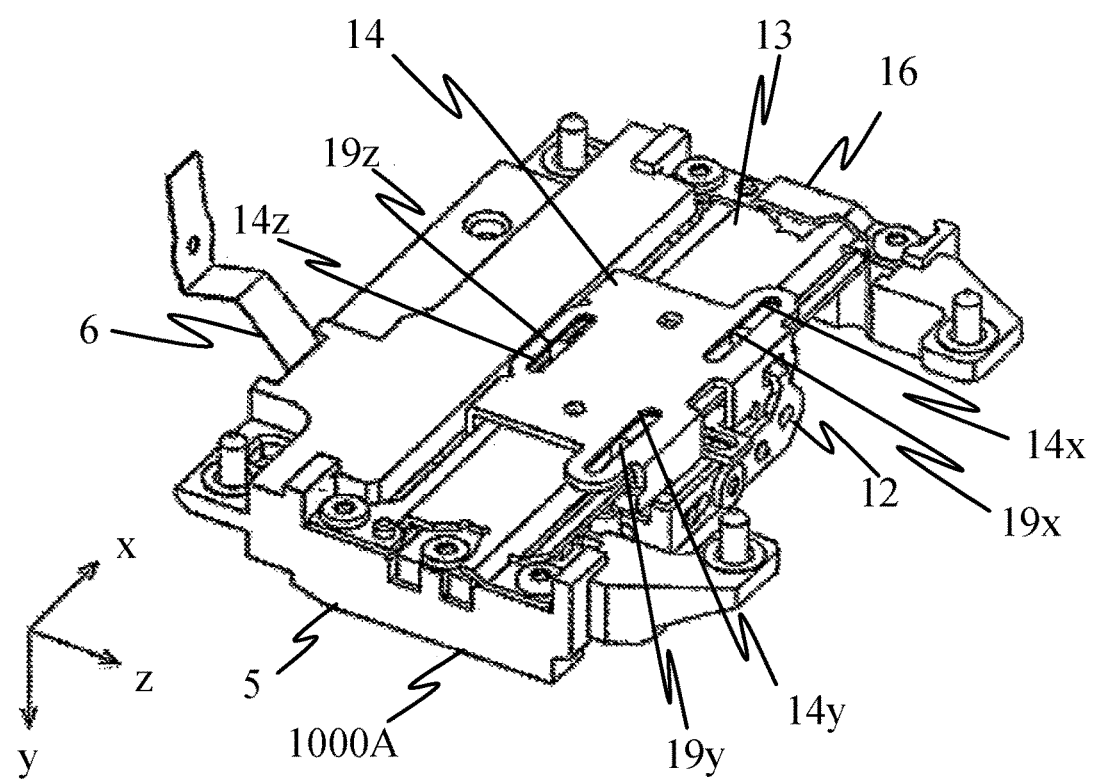
Figure 4:
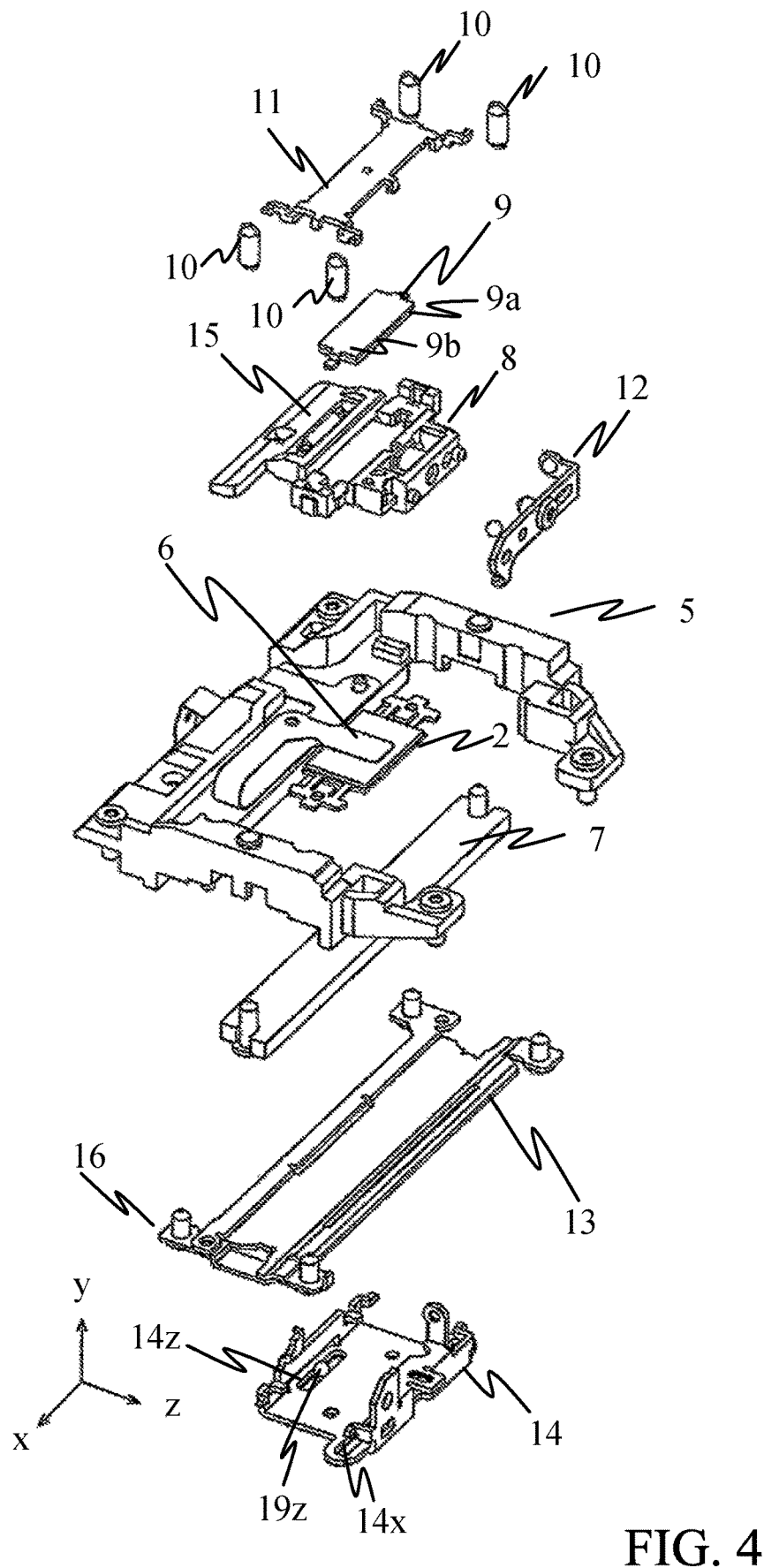
FIG. 4 is an exploded perspective view of the vibration-wave motor unit according to the first embodiment.
Figure 5A:
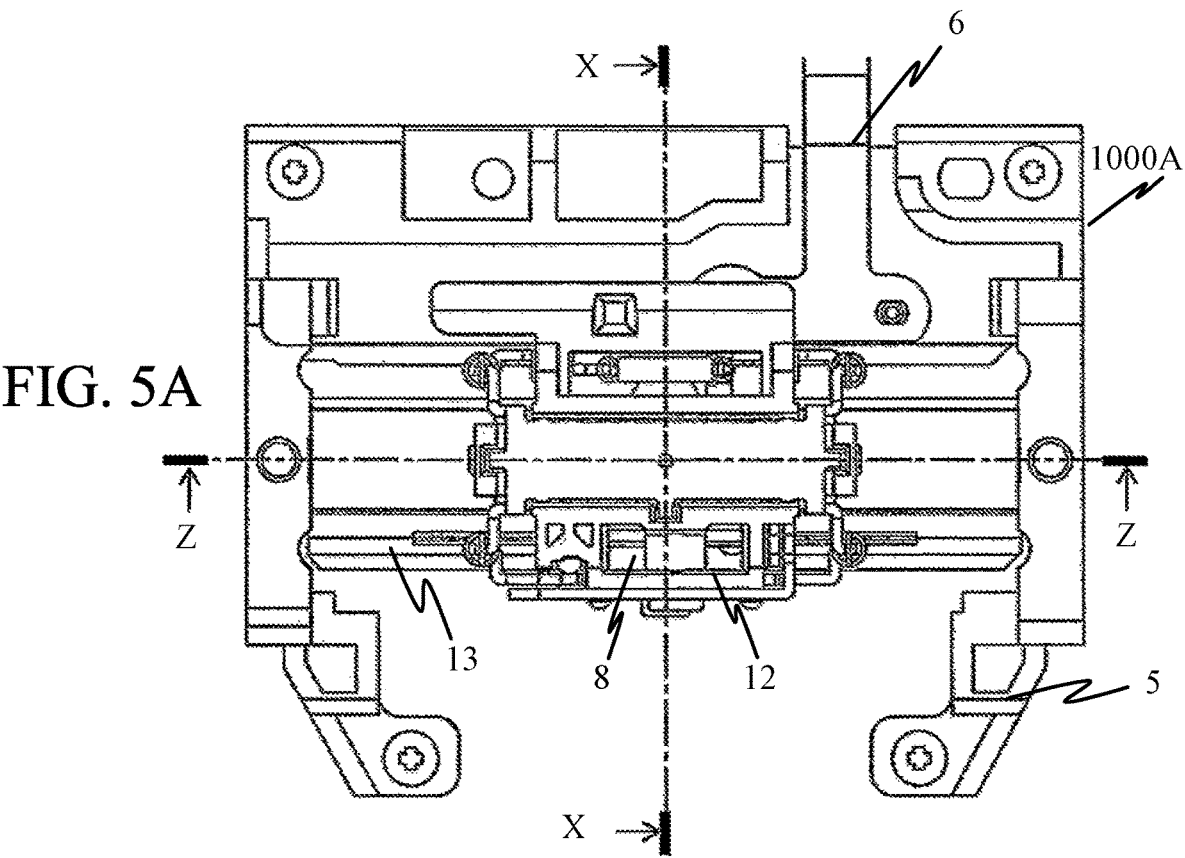
FIGS. 5A, 5B, and 5C are plane and sectional views of the vibration-wave motor unit according to the first embodiment.
Figure 5B:
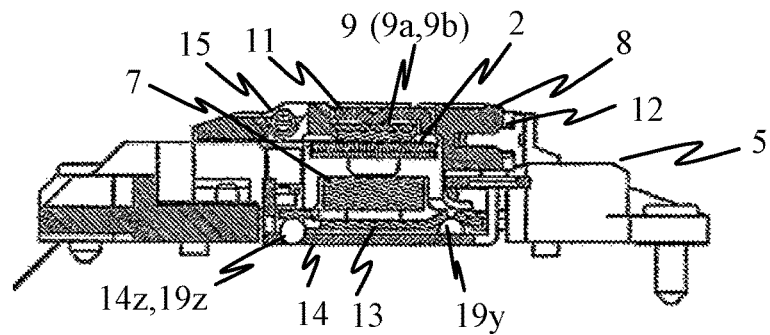
Figure 5C:
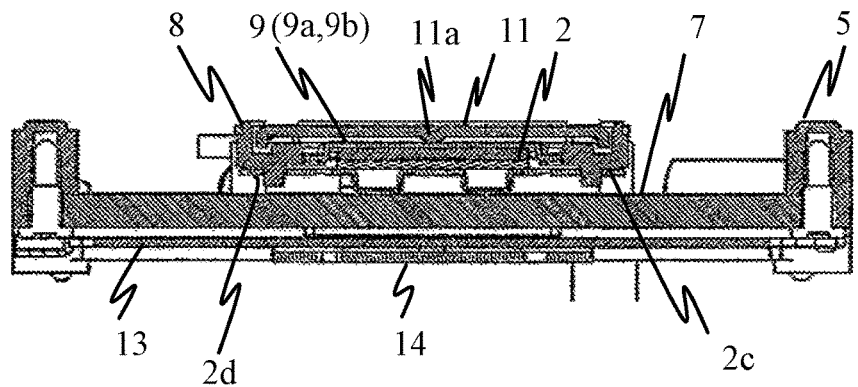

Referring now to FIGS. 3A to 5C, a description will be given of a structure of the motor unit 1000A. FIGS. 3A and 3B are perspective views of the motor unit 1000A. FIG. 3A is a perspective view on the plane side. FIG. 3B is a perspective view on the bottom surface side. FIG. 4 is an exploded perspective view of the motor unit 1000A. FIGS. 5A to 5C are plane and sectional views of the motor unit 1000A. FIG. 5A is a plane view. FIGS. 5B and 5C are x-x and z-z sectional views in FIG. 5A, respectively.

A base member 5 is screwed onto an unillustrated fixing unit, and fixes the friction member 7 through screws. The friction member 7 frictionally contacts the protruding parts 2a and 2b in the vibrator 2 through the pressing force by a tension coil spring 10. A flexible substrate 6 is mechanically and electrically connected to the piezoelectric element 4 through an anisotropic conductive paste etc. and applies a two-phase, high frequency voltage to the piezoelectric element 4. A vibrator holding frame 8 (holding member) is integrated with the vibrator 2 by fixing the fixed arms 2c and 2d in the vibrator 2 through adhesions etc. A pressing intermediary member 9 includes a felt 9a that contacts the vibrator 2, and a highly rigid plate 9b, such as metal, that receives a pressing force from the tension coil spring 10. The felt 9a transmits the pressing force by the tension coil spring 10 to the vibrator 2 without preventing the vibrations excited in the vibrator 2. Four tension coil springs 10 are provided around the vibrator 2, and serve as a pressing member in this embodiment which generates a pressing force in a y-axis negative direction. A press plate 11 is forced by the tension coil springs 10. The press plate 11 includes a spherical projection 11a that contacts the pressing intermediary member 9 on the nodal (or intersection) line between the longitudinal symmetrical plane C and the lateral symmetrical plane D in the vibrator 2. A coupling metal sheet (coupling member) 12 is screwed onto the vibrator holding frame 8. A guide member 13 is screwed onto the base member 5 via a fixing metal sheet 16 so as to be parallel to the contact surface of the friction member 7 with the protruding parts 2a and 2b. A movable member 14 is forced by the tension coil springs 10. Each of (rolling) balls 19x, 19y, and 19z is held by the guide member 13 and the movable member 14, and receives the pressing forces by the tension coil springs 10. An integration spring (urging or forcing member) 15 is a tension coil spring, and applies a force via the coupling metal sheet 12 such that the vibration 8 and the movable member 14 together translationally move in the x-axis direction. In this embodiment, a moving member that includes the vibrator 2, the vibrator holding frame 8, the pressing intermediary member 9, the tension coil spring 10, the press plate 11, the coupling metal sheet 12, and the movable member 14 moves along the x-axis relative to the friction member 7.

Referring now to FIG. 6, a description will be given of the degree of freedom of a motion in the vibrator according to this embodiment. FIGS. 6A to 6E are explanatory views of the degree of freedom of the motion in the vibrator 2. FIGS. 6A to 6E omit components in the motor unit 1000A unnecessary for the description. FIG. 6A illustrates the vibrator holding frame 8 and the movable member 14 integrated via the coupling metal sheet by the force by the integration spring 15. The integration spring 15 is engaged between a hook part 8a provided to the vibrator holding frame 8 and a hook part 14b provided to the movable member 14. A reference ball (first rotation center part) 17 is held between a conical hole part (first contact part) 12a formed in the coupling metal sheet 12 and a conical hole part (first contact part) 14a formed in the movable member 14. In this embodiment, the reference ball 17 and the conical hole parts 12a and 14a serve as a rotating unit configured to allow the vibrator holding frame 8 to rotate around each of three axes relative to the movable member 14 and to restrict the vibrator holding frame 8 from translating in each of the three axes relative to the movable member 14. A (rolling) ball 18 is held between a V-shaped groove (second contact part) 8b formed in the vibrating holding frame 8 and a plane part (second contact part) 14c formed in the movable member 14. Since the ball 18 is held between the V-shaped groove 8b and the plane part 14c, the vibrator holding frame 8 is restricted from rotating in a rotating direction (yaw direction) around the y-axis and the reference ball 17 on the movable member 14 as a center. In other words, in this embodiment, the V-shaped groove 8b, the plane part 14, and the ball 18 serve as a restricting unit that restricts the vibrator holding frame 8 from rotating around the rotating unit as a rotation center.

FIG. 6B is a sectional view of the motor unit 1000A severed by a setting center plane of the integration spring 15, the reference ball 17, and the ball 18. Each of the arrows A, B, and C indicates a force applied to the vibrator holding frame 8. A force expressed by the arrow A (coupling force vector) is a force applied by the integration spring 15 to the vibrator holding frame 8 so as to rotate the vibrator holding frame 8 around the reference ball 17 as a center. A force expressed by the arrow B (reaction vector) is a force applied by the ball 18 to the V-shaped groove 8b on the plane part 14c. Since the ball 18 is held between the V-shaped groove 8b and the plane part 14c, the vibrator holding frame 8 and the movable member 14 are restricted from rotating around the reference ball 17 as a center and the vibrator holding frame 8 is restricted from rotating in the yaw direction. At this time, a moment by the force A around the reference ball 17 and a moment by the force B around the reference ball 17 as a center are balanced with each other.

The rotation around the reference ball 17 as a center means a rotation around the rotating unit as a center or part of the rotating unit as a center.

The force C is a force (reaction vector) applied to the vibrator holding frame 8 via the coupling metal sheet 12, but as illustrated in FIG. 6C, is balanced with the resultant force of the forces A and B. This configuration restricts the vibrator holding frame 8 from moving in the x-axis direction (x-axis translation direction) and the z-axis direction (z-axis translation direction). In addition, since the reference ball 17 is held between the conical hole parts 12a and 14a, the vibrator holding frame 8 is also restricted from moving in the y-axis direction.

As described above, in this embodiment, the vibrator holding frame 8 integrated with the vibrator 2 relative to the movable member 14 has two moving degrees of freedom in the rotating direction around the x-axis direction (roll direction) and in the rotating direction around the z-axis direction (pitch direction). Since the vibrator 2 has moving degrees of freedom in the roll direction and in the pitch direction in this embodiment, the protruding parts 2a and 2b of the vibrator 2 can be surely brought into contact with the friction member 7. The forces A to C for restricting the vibrator 2 from moving are balanced with one another on the same plane, and do not apply unbalanced, unnecessary forces to the protruding parts 2a and 2b.

FIGS. 6D and 6E illustrate that the vibrator holding frame 8 rotates in the roll direction and in the pitch direction around the reference ball 17 as a center. As described in FIGS. 6D and 6E, the rotation in the roll direction moves up and down the protruding parts 2a and 2b in the y-axis direction, and the rotation in the pitch direction can reduce a positional difference between the protruding parts 2a and 2b in the y-axis direction.

The reference ball 17 rotates with a sliding friction with the conical hole part 12a or 14a. Since the reference ball 17 uses a highly precisely worked ball in a shape and surface roughness, as in steel balls for ball bearings, and proper lubricant, a load torque can be restrained down to a practical value relative to the sliding friction relative to the generating force of the integration spring 15 and the forces by the four tension coil springs 10. In addition, even when the reference ball 17 may be integrated with either the conical hole part 12a or the conical hole part 14a, the reference ball 17 functionally works well. When the reference ball 17 is fixed through adhesions, the assembling performance can improve. Moreover, either the coupling metal sheet 12 or 14 may have a shape corresponding to the reference ball 17.

The conical hole part 12a is provided in the coupling metal sheet 12, but may be provided to the vibrator holding frame 8. At this time, the reference ball 17 may be integrated with the conical hole part provided in the vibrator holding frame 8. Moreover, the vibrator holding frame 8 may have a shape corresponding to the reference ball 17.

The reference ball 18 may be integrated with either the V-shaped groove 8b or the plane part 14c. In this case, the ball 18 may be fixed onto either the V-shaped groove 8b or the plane part 14c through adhesions, etc., and the V-shaped groove 8b or the plane part 14c may have a shape corresponding to the ball 18.

Figure 7:
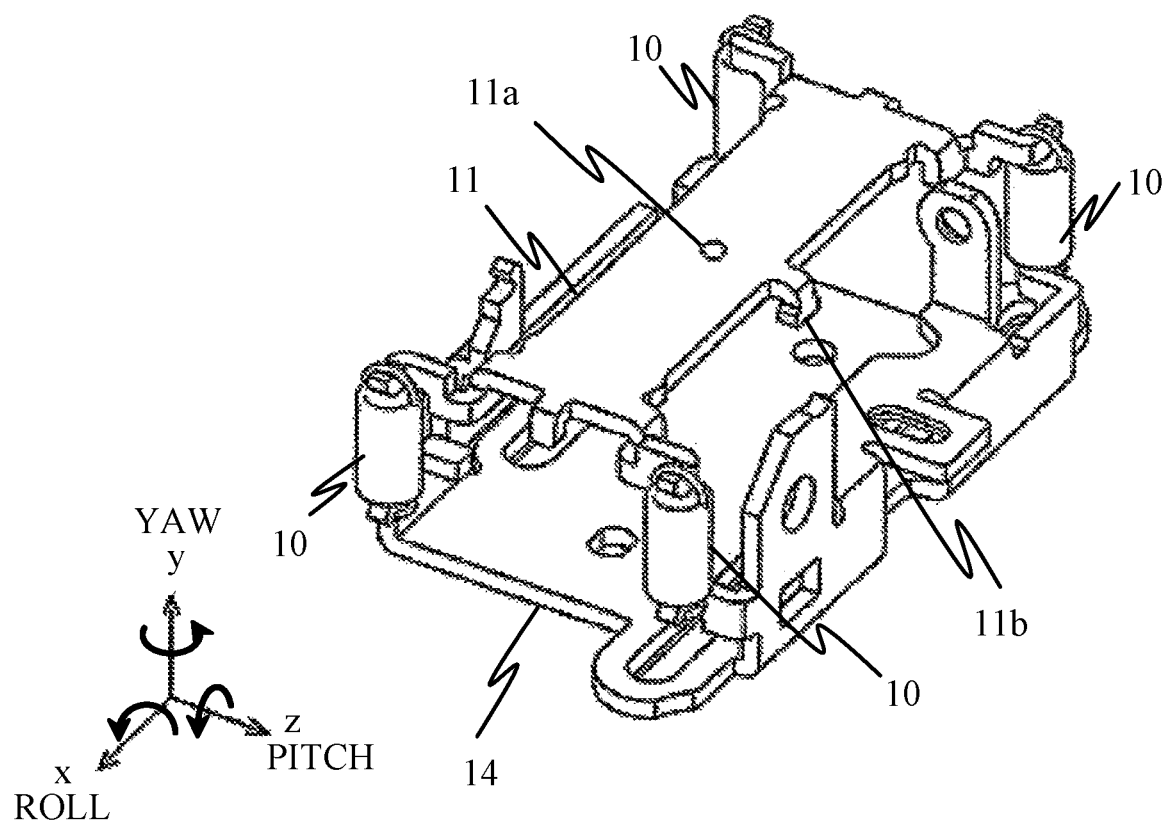
FIG. 7 is an explanatory view of a relationship between a press plate and a movable member according to the first embodiment.

FIG. 7 is an explanatory view of the relationship between the press plate 11 and the movable member 14. The four tension coil springs 10 are engaged with each spring engagement part of the press plate 11 and the movable member 14. Since an interval between the press plate 11 and the movable member 14 in the y-axis direction is determined by the unillustrated component of the motor unit 1000A, the four tension coil springs 10 force the press plate 11 and the movable member 14. The four tension coil springs 10 are springs of the same type symmetrically arranged at regular intervals from the spherical projection 11a. However, the force of each tension coil spring at a predetermined length is not always equal due to the manufacturing scattering, and the position of each spring engagement part in the press plate 11 and the movable member 14 has an error due to the manufacturing precision in the single component and the manufacturing error of the intervening component. In this embodiment, the press plate 11 contacts the pressing intermediary member 9 through the spherical projection 11a and has degrees of freedom of the movement (inclination) in the roll direction and pitch direction around the spherical projection 11a as the fulcrum.

In other words, the press plate 11 can incline around both an axis as a center orthogonal to the longitudinal symmetrical C on the lateral symmetrical plane D and an axis as a center orthogonal to the lateral symmetrical plane D on the longitudinal symmetrical C. A configuration that can incline around each exact axis as a center is not always necessary, and a configuration that can incline around an axis as a center that shifts from each corresponding axis by several millimeters may be regarded as the configuration that can incline around each axis. For example, the shift by about ±0.2 mm is permissible although the shift breadth depends on the performance and usage. Therefore, each of the pressing forces applied by the four tension coil springs 10 from the spherical projection 11a to the protruding parts 2a and 2b via the pressing intermediary member 9 is optimized notwithstanding the above manufacturing scattering.

The center axis around which the press plate 11 inclines may be defined as follows: The first pressing member may incline around a first direction as a center where the first direction (z-axis direction) is defined as a direction orthogonal to the moving direction of the first vibrator and the pressing directions by a plurality of pressing members. This definition is similarly applied to each embodiment which will be described later.

Since the press plate 11 has moving degrees of freedom in the roll direction and in the pitch direction relative to the vibrator holding frame 8 that contains the pressing intermediary member 9, the orientation of the press plate 11 relative to the movable member 14 is optimized irrespective of the inclination and the inclination change of the vibrator holding frame 8. Hence, the pressing forces applied by the four tension coil springs 10 to the protrusion parts 2a and 2b from the spherical projection 11a via the pressing intermediary member 9 become stable without scattering. Furthermore, a distance between the press plate 11 and the movable member 14 in the y-axis direction may change, but the spring constant of the tension coil spring 10 which can be made smaller than that of a flat spring etc. is advantage to the stabilization of the pressing force.

Since a projection 11b provided to the press plate 11 is engaged with a groove part 8c formed in the vibrator holding frame 8 illustrated in FIG. 6B, the press plate 11 and the movable member 14 are integrated in the x-axis direction via the vibrator holding frame 8. Hence, while the moving part moves along the x-axis, the positional relationship among the tension coil springs 10, the press plate 11, and the movable member 14 does not change and the pressing forces applied by the tension coil springs 10 become stable.

Figure 8A:
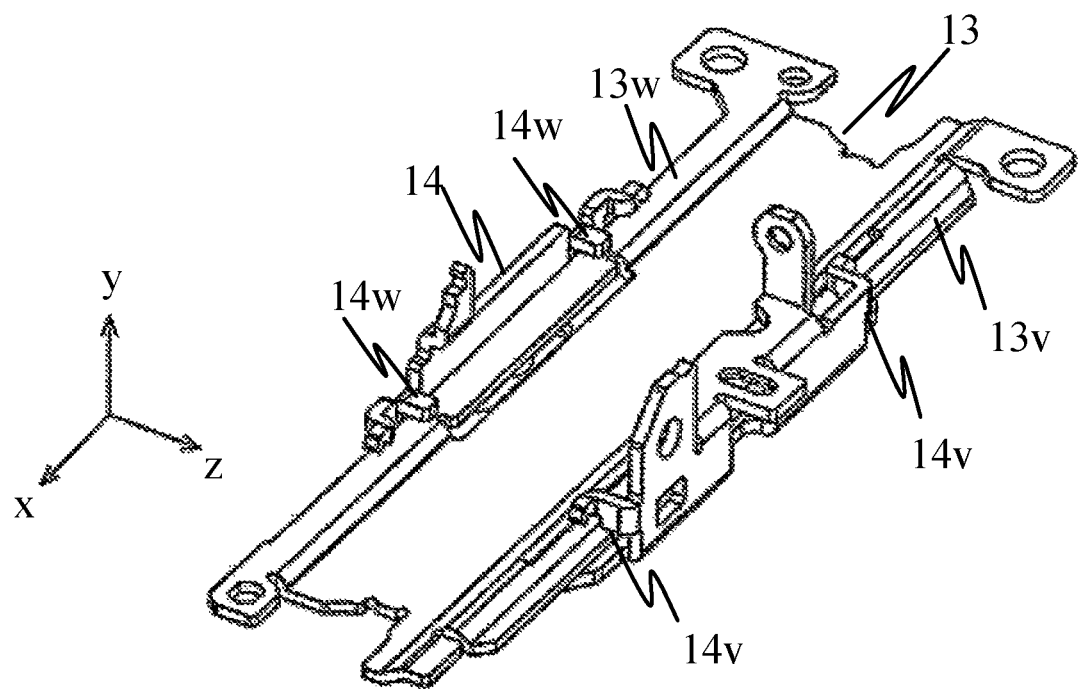
FIGS. 8A and 8B are perspective views of a linear guide part according to the first embodiment.
Figure 8B:
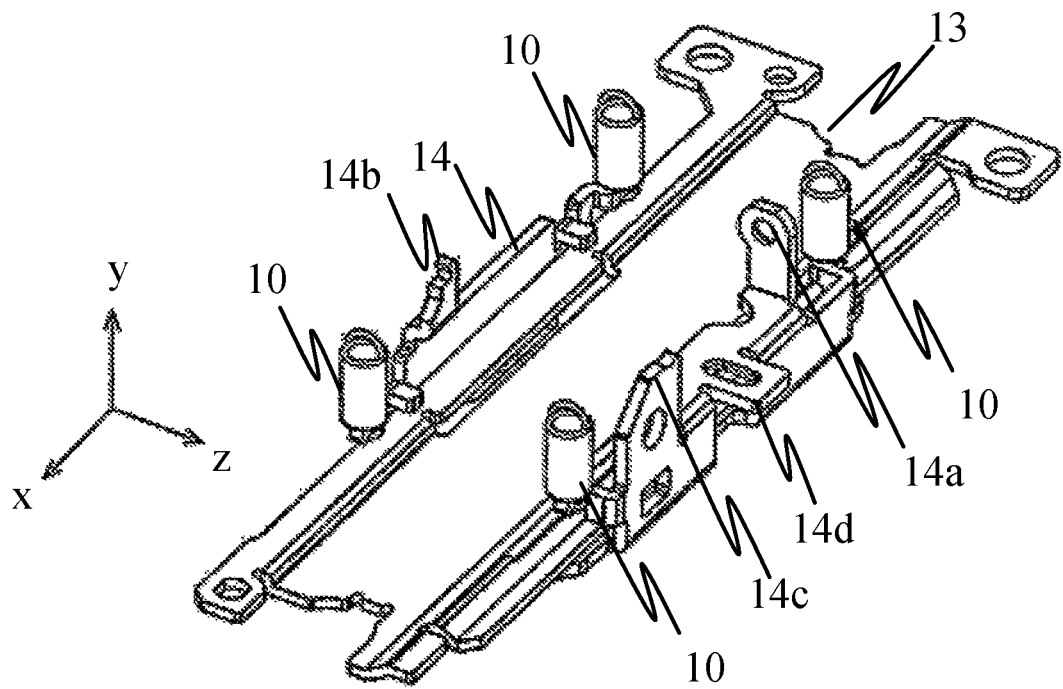

FIGS. 8A and 8B are perspective views of a linear guide part that includes the guide member 13, the movable member 14, the balls 19x, 19y, and 19z held between the guide member 13 and the movable member 14. FIGS. 9A to 9D are explanatory views of the linear guide part. The movable member 14 has linear guide grooves 14x, 14y, and 14z parallel to the x-axis direction (or the moving direction of the moving part) engaged with the balls 19x, 19y, and 19z. The linear guide grooves 14x and 14y are formed and spaced from each other on the same line parallel to the x-axis or arranged in series along the x-axis. In addition, the linear guide groove 14z is spaced from the linear guide grooves 14x and 14y in the z-axis direction and formed along the x-axis. The movable member 14 smoothly moves along the x-axis relative to the guide member 13 in response to the pressing forces applied by the tension coil springs 10 when the balls 19x, 19y, and 19z roll.

FIG. 9A illustrates that the guide member 13 and the movable member 14 contact the balls 19x, 19y, and 19z. FIG. 9B is a sectional view taken along line that passes the balls 19y and 19z in the state illustrated in FIG. 9A. Parts of the linear guide grooves 14x, 14y, and 14z have surfaces having open angles of 60° so as to engage with corresponding balls. The guide member 13 has guide walls 13x-y that are opposite to the linear guide grooves 14x and 14y, continuously formed along the x-axis, and engaged with the balls 19x and 19y. Each the guide wall 13x-y has an open angle of 120° so as to be engaged with a corresponding one of balls. The guide member 13 has a guide plane part 13z opposite to the linear guide groove 14z, formed along the x-axis parallel to the xz plane, and engaged with the ball 19z. Part of each linear guide groove has a surface having the open angle of 60° in this embodiment, but the present invention is not limited to this embodiment. For example, part of each linear guide groove may have a surface along the x-axis with a predetermined angle relative to the xz surface as long as the whole linear guide groove may be formed as a V-shaped groove having a predetermined angle. In addition, the guide walls 13x-y have open angles of 120° in this embodiment, but the present invention is not limited to this embodiment. For example, the guide walls 13x-y may be formed with a predetermined angle relative to the xz surface along the x-axis as long as they are engaged with the corresponding balls.

The guide member 13 has plane parts 13v and 13w. The movable member 14 has four spring engagement parts engaged with the tension coil springs 10, as described above. In the state of FIG. 9A, two out of the four spring engagement parts are provided so that a restricting part 14v as part of them and the plane part 13v form an interval (distance) "a" in the y-axis direction. In addition, the movable member 14 has two stopper parts 14w so as to form the interval "a" with the plane part 13w in the y-axis direction in the state of FIG. 9A.

FIG. 9C illustrates that the guide member 13 and the movable member 14 contact each other in the y-axis direction or the plane part 13v and the two restricting parts 14v contact each other and the plane part 13w and the two stopper parts 14w contact each other. FIG. 9D is a sectional view at the position of the ball 19z in the state in FIG. 9C. In FIG. 9C, the balls 19x, 19y, and 19z are engaged with the linear guide grooves 14x, 14y, and 14z, but do not contact the guide member 13. In addition, in FIG. 9D, the balls 19x, 19y, and 19z contact the guide member 13 but do not contact the movable member 14. As illustrated in FIG. 9D, the ball 19z is engaged with the linear guide groove 14z in the movable member 14 by an interval (distance) "b" even at the contact position with the guide member 13, and does not drop from the linear guide groove 14z. The balls 19x and 19y are engaged with the linear guide grooves 14x and 14y in the movable member 14 by the interval "b", and do not drop from the linear guide groove 14x and 14y.

As described above, this embodiment provides the restricting part 14v and the stopper part 14w that contact the plane parts 13v and 13w, and can prevent the balls 19x, 19y, and 19z from dropping. More specifically, the restricting part 14v and the stopper part 14w may be provided so that the interval "a" is shorter than an interval (distance) "c" from a design plane 14e of the movable member 14 to a position of each rolling member engaged with the corresponding linear guide groove. In this embodiment, the restricting part 14v and the stopper part 14w are provided so that as the guide member 13 moves in the y-axis direction, each ball can be engaged with the movable member 14 by the interval "b" or part of each ball is located in the corresponding linear guide groove. The motor unit 1000A according to this embodiment includes three balls 19x, 19y, and 19z, but the present invention is not limited to this embodiment. For example, the motor unit may include three or more balls, and the guide part in the guide member 13 and the linear guide groove in the movable member 14 may be formed accordingly. However, when three or more balls are provided, one or more balls are unengaged with the guide part or linear guide groove due to the manufacturing errors of the ball and linear guide grooves and it is difficult to highly precisely move the movable member 14. Hence, in order to highly precisely move the movable member 14, exactly three balls may be provided.

This embodiment disposes the spring engagement part of the movable member 14 on a projected plane of the guide member 13 in the y-axis direction, as illustrated in FIG. 8B. More specifically, the spring engagement parts are arranged so as to hold the linear guide grooves 14x, 14y, and 14z, the guide walls 13x-y, and the guide plane part 13z. This arrangement can effectively utilize a space of the guide member 13 on the y-axis positive side (or a space on a plane side opposite to a plane on which the guide walls 13x-y and the guide plane part 13z are formed). In addition, the conical hole part 14a engaged with the reference ball 17, and the hook part 14b engaged with the integration spring 15, and the following interlock part 14d are arranged on the projection plane of the guide member 13 in the y-axis direction. More specifically, these components are arranged so as to hold the linear guide grooves 14x, 14y, and 14z, the guide walls 13x-y, and the guide plane part 13z. The motor unit 1000A can be made smaller by utilizing the space on the y-axis positive side of the guide member 13.

Figure 10A:
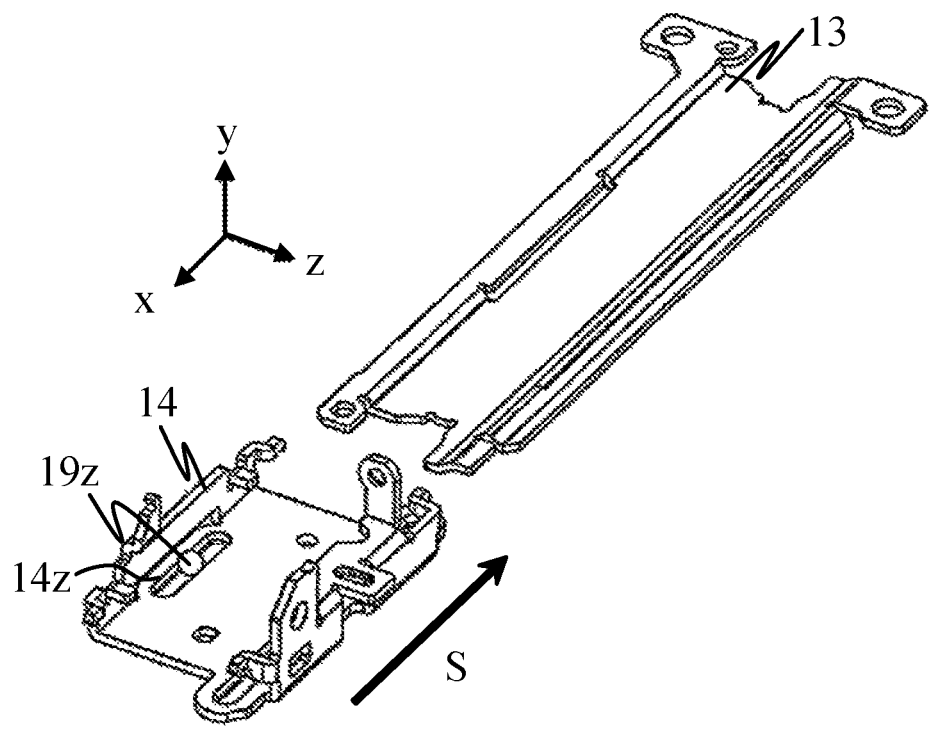
FIGS. 10A and 10B are explanatory views of an assembly of the linear guide part according to the first embodiment.
Figure 10B:
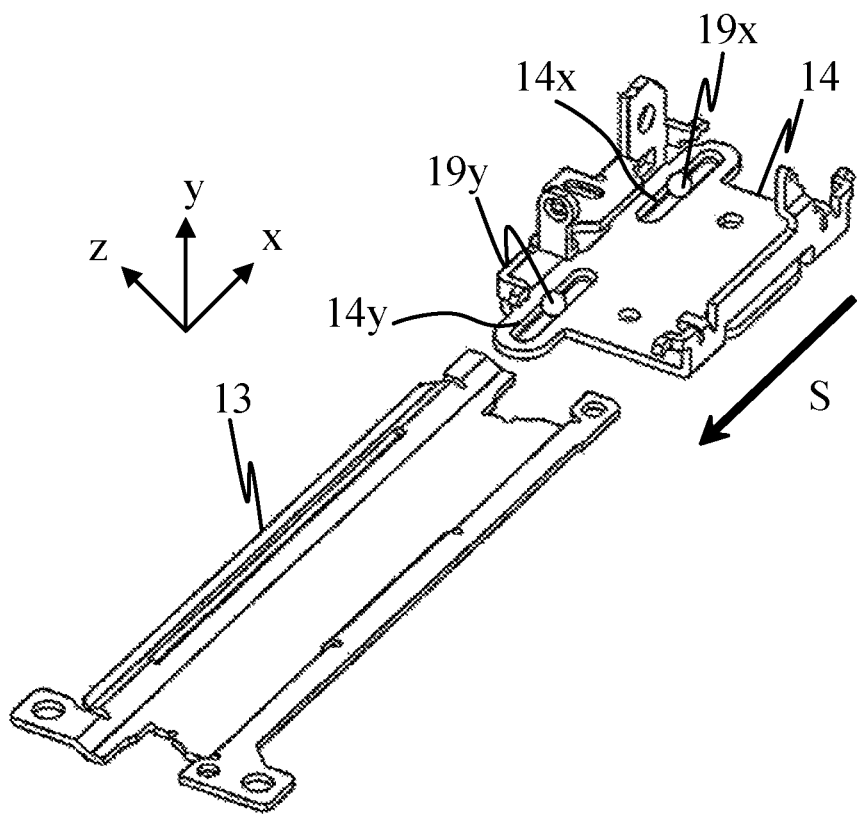

Due to the above structure, this embodiment cannot assemble the guide member 13, the movable member 14, and the balls 19x, 19y, and 19z in the y-axis direction. Hence, as illustrated in FIGS. 10A and 10B, this embodiment places the balls 19x, 19y, and 19z on the linear guide grooves 14x, 14y, and 14z in the movable member 14, slides them in an arrow S direction, and inserts them into the guide member 13, realizing the assembly state illustrated in FIG. 8A.

Figure 11A:
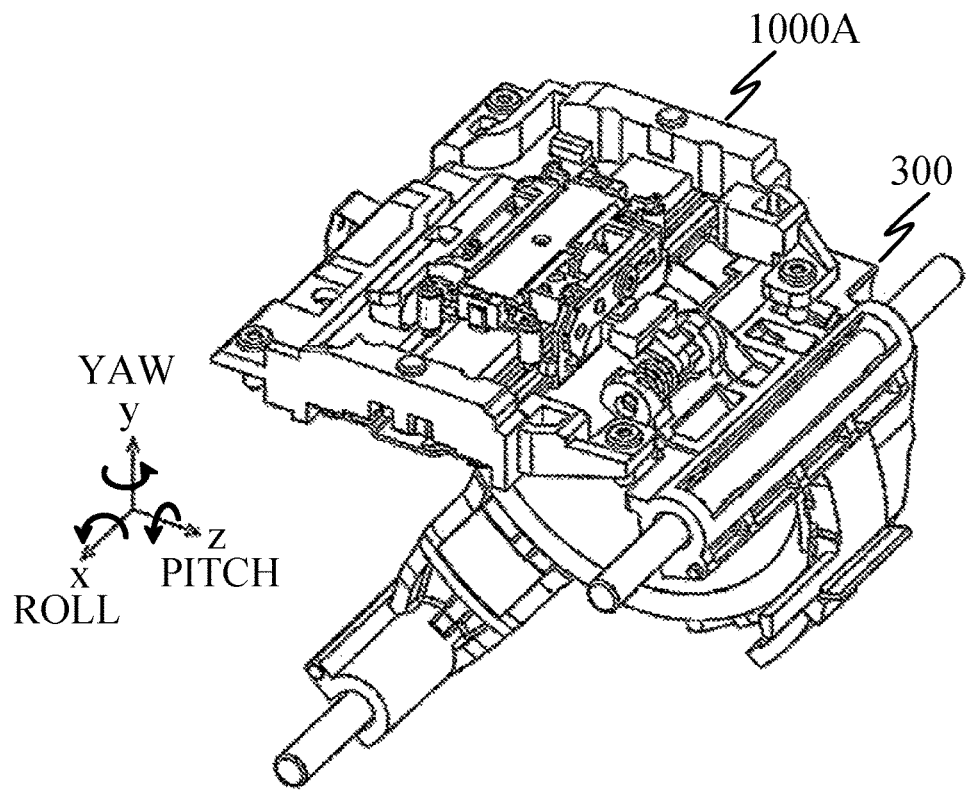
FIGS. 11A, 11B, 11C, and 11D are perspective views of a lens driving unit according to the first embodiment.
Figure 11B:
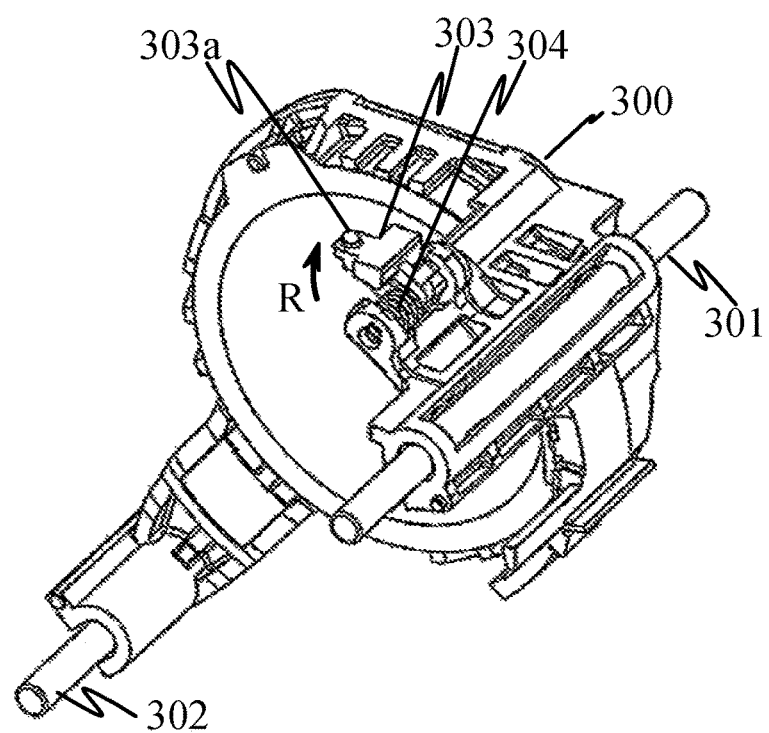
Figures 11C, 11D:
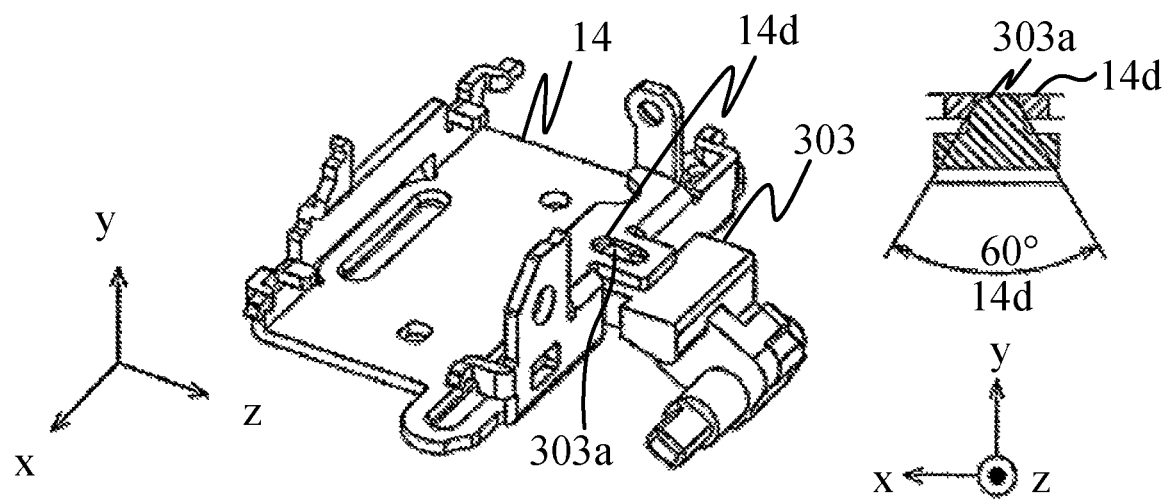

FIG. 11A is a perspective view of the lens driving unit to which the motor unit 1000A is attached. FIG. 11B is a perspective view of the lens driving unit from which the motor unit 1000A is detached. FIG. 11C illustrates the coupling part between the motor unit 1000A and the lens unit 300. FIG. 11D is a sectional view of the coupling part. The lens unit 300 is movably supported along the optical axis (x-axis) by the bar-sleeve structure. Guide bars 301 and 302 are formed parallel to the x-axis, and supported by unillustrated members. An interlock member 303 is integrated with the lens unit 300 via an interlock urging spring 304 in the optical axis direction, and receives the rotating force in an arrow R direction. An interlock member 14d provided to the movable member 14 has a groove shape having an open angle of 60°, as illustrated in FIG. 11D. Due to the rotating force in the arrow R direction illustrated in FIG. 11B, a spherical interlock part 303a provided to the interlock member 303 is engaged with the groove shape formed in the interlock part 14d, and transmits the driving force of the motor unit 1000A to the lens unit 300 via the interlock member 303. In addition, the rotating force of the interlock member 303 in the arrow direction R is received by the guide member 13 via the balls 19x, 19y, and 19z. In addition, a positional error between the motor unit 1000A and the lens unit 300 in the y-axis direction is absorbed by the rotation of the interlock member 303 in the arrow R direction, and the positional error in the z-axis direction is absorbed as the engagement position between the groove shape formed in the interlock part 14d and the spherical interlock part 303a moves in the z-axis direction. Hence, even when there is a manufacturing error, the motor unit 1000A can smoothly and surely drive the lens unit 300 along the optical axis.

Second Embodiment

Figure 12A:
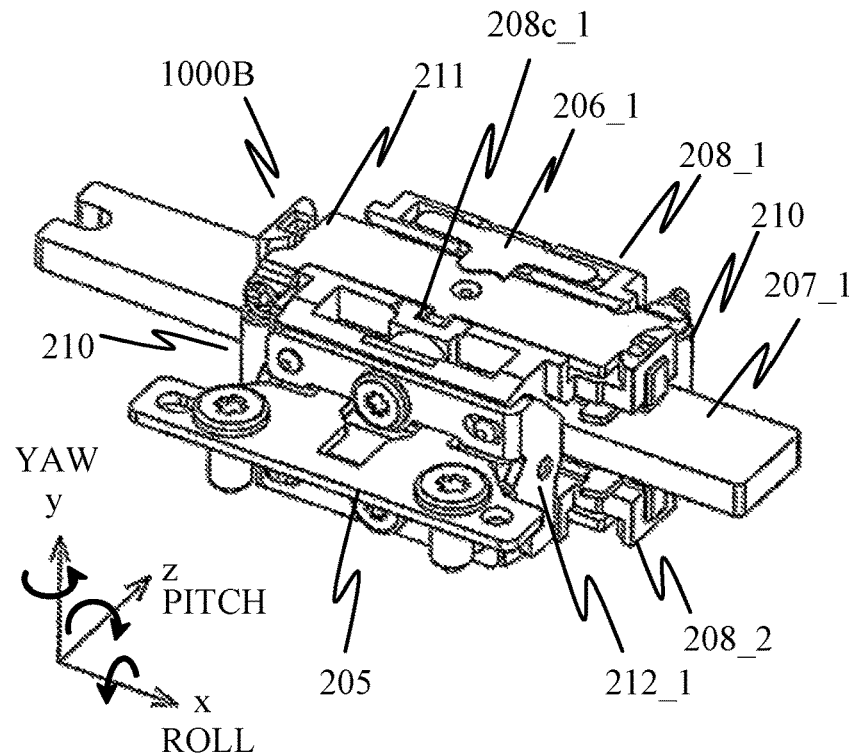
FIGS. 12A and 12B are perspective views of a vibrator according to a second embodiment.
Figure 12B:
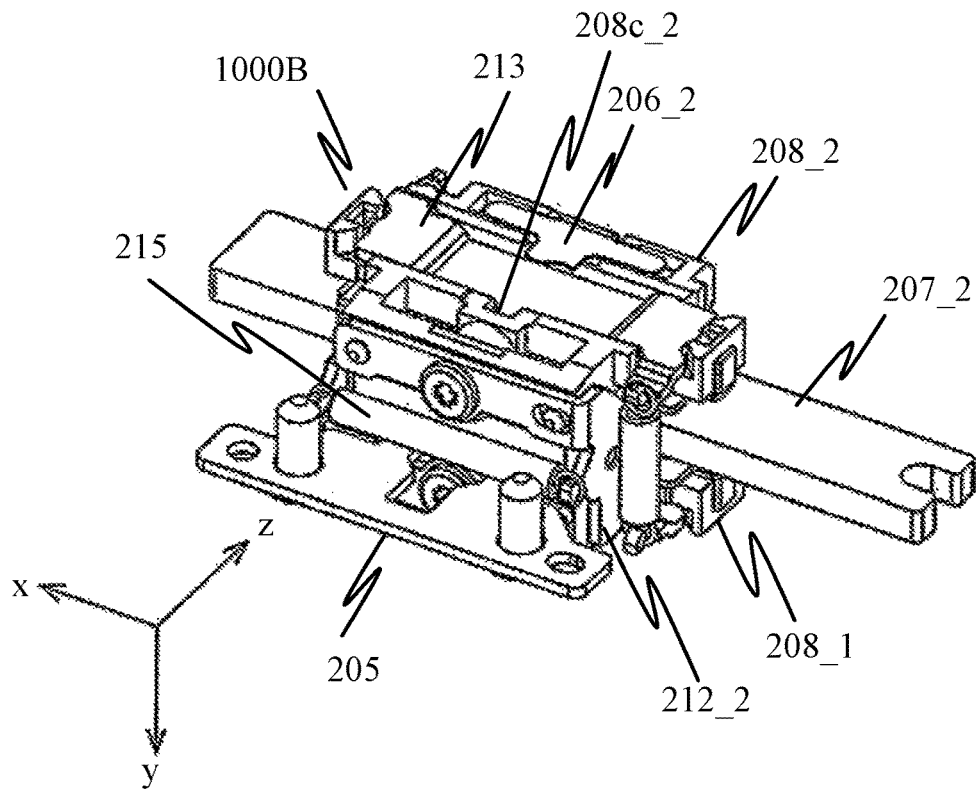
Figure 13:
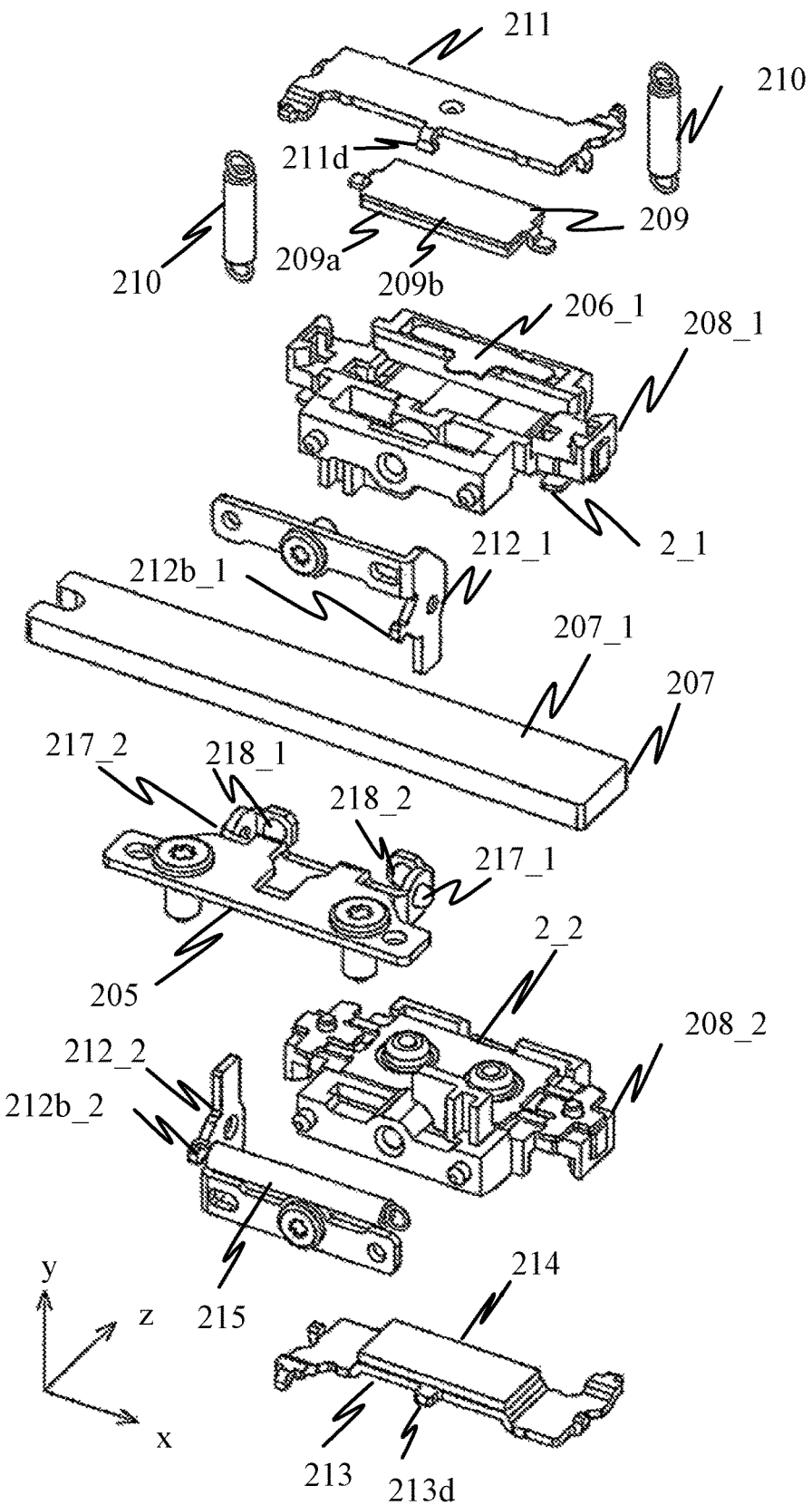
FIG. 13 is an exploded perspective view of the vibration-wave motor unit according to the second embodiment.
Figure 14A:
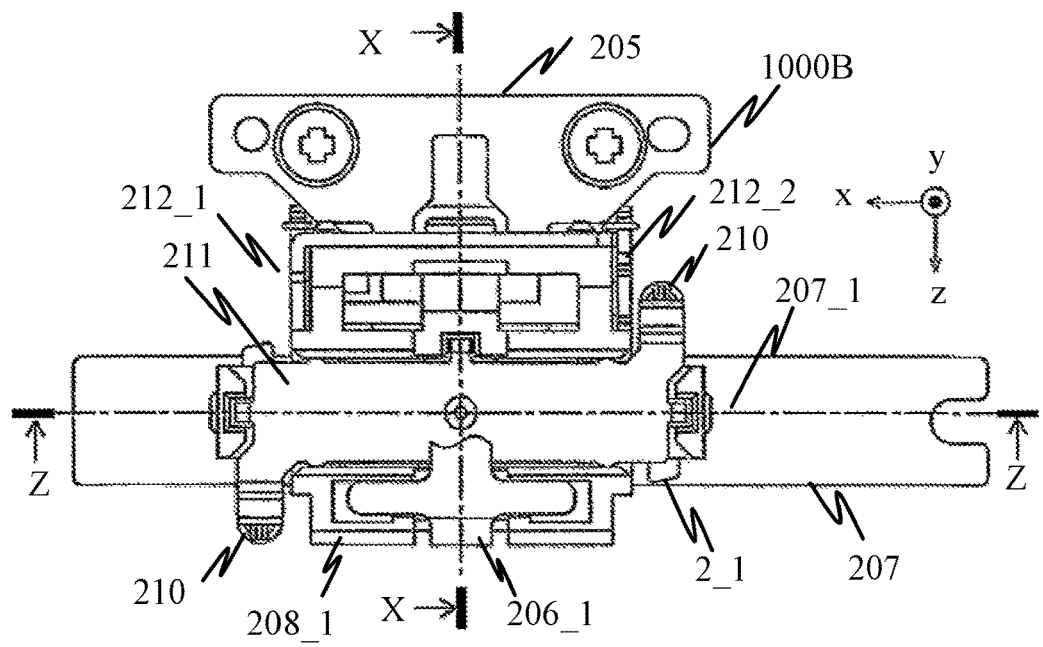
FIGS. 14A, 14B, and 14C are plane and sectional views of the vibration-wave motor unit according to the second embodiment.
Figure 14B:
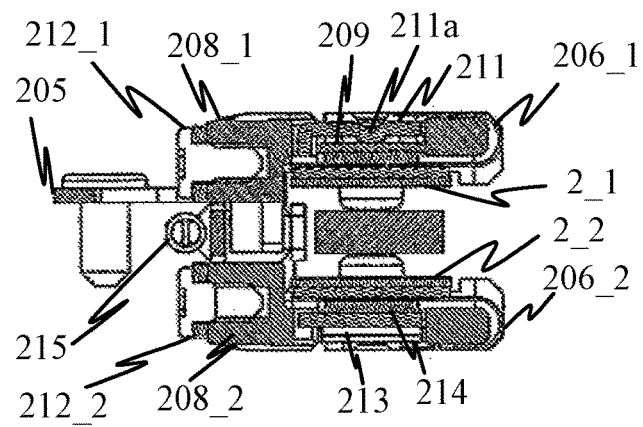
Figure 14C:
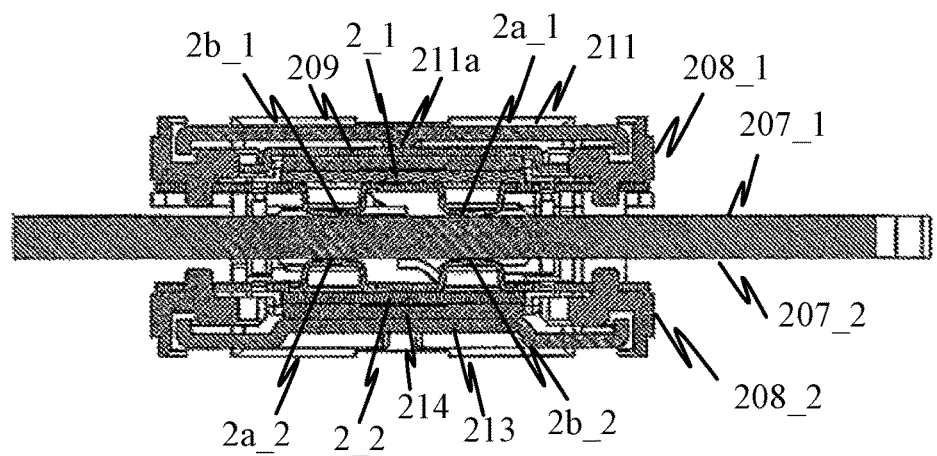

Referring now to FIG. 12A to 14C, a description will be given of the configuration of a vibration-wave motor unit 1000B according to this embodiment (ultrasonic motor unit, referred to as a "motor unit" hereinafter). FIGS. 12A and 12B are perspective views of the motor unit 1000B. FIG. 12A is a perspective view on the plane side. FIG. 12B is a perspective view on the bottom surface side. FIG. 13 is an exploded perspective view of the motor unit 1000B. FIGS. 14A to 14C are plane and sectional views of the motor unit 1000B. FIG. 14A is a plane view. FIGS. 14B and 14c are x-x and z-z sectional views in FIG. 14A, respectively.

The motor unit 1000B according to this embodiment includes a first vibrator $2\_1$ and a second vibrator $2\_2$. Each of the first vibrator $2\_1$ and the second vibrator $2\_2$ is configured similarly to the vibrator 2 according to the first embodiment. The first vibrators $2\_1$ and the second vibrator $2_{13}$ 2 hold the friction member 207. Protruding parts $2a\_1$ and $2b\_1$ in the first vibrator $2\_1$ contact a first contact surface $207\_1$ in the friction member 207 on the side of the first vibrator $2\_1$. Protruding parts $2a\_2$ and $2b\_2$ in the second vibrator $2\_2$ contact a second contact surface $207\_2$ in the friction member 207 on the side of the second vibrator $2\_2$.

The base member 205 is screwed onto an unillustrated fixing member. Flexible substrates $206\_1$ and $206\_2$ are mechanically and electrically connected to the first vibrator $2\_1$ and the second vibrator $2\_2$ so as to vibrate the first vibrator $2\_1$ and the second vibrator $2\_2$, respectively. A first vibrator holding frame $208\_1$ and a second vibrator holding frame $208\_2$ are integrated with the first vibrator $2\_1$ and the second vibrator $2\_2$ by fixing a fixed arm in the first vibrator $2\_1$ and a fixed arm in the second vibrator $2\_2$ through adhesions etc. A pressing intermediary member 209 includes a felt 209a that contacts the first vibrator $2\_1$, and a highly rigid plate 209b, such as metal, that receives a pressing force from a tension coil spring 210. The felt 209a transmits the pressing force applied by the tension coil spring 210 to the first vibrator $2\_1$ without preventing the vibrations excited in the first vibrator $2\_1$. Two tension coil springs 210 are provided around the first vibrator $2\_1$ and the second vibrator $2\_2$, and serve as a pressing member in this embodiment which generates a pressing force as described above. A first pressing plate 211 is forced by the tension coil spring 210. The first pressing plate 211 includes a spherical projection 211a that contacts the pressing intermediary member 209 on the nodal (or intersection) line between the longitudinal symmetrical plane C and the lateral symmetrical plane D in the first vibrator $2\_1$. A first coupling metal sheet $212\_1$ and a second coupling metal sheet $212\_2$ are screwed onto the first vibrator holding frame $208\_1$ and the second vibrator holding frame $208\_2$, respectively. A second press plate (second pressing member) 213 is forced by the tension coil springs 210. A felt 214 transmits the pressing force applied by the tension coil spring 210 to the second vibrator $2\_2$ without preventing the vibrations excited in the second vibrator $2\_2$. An integration spring 215 is a tension coil spring engaged between a hook part $212b\_1$ provided to the first coupling metal sheet $212\_1$ and a hook part $212b\_2$ provided to the second coupling metal sheet $212\_2$. The integration spring 215 applies a force to the first vibrator holding frame $208\_1$ and the second vibrator holding frame $208\_2$ via the first coupling metal sheet $212\_1$ and the second coupling metal sheet $212\_2$. The first vibrator holding frame $208\_1$ and the second vibrator holding frame $208\_2$ forced by the integration spring 215 are integrated with a base member 205 in the x-axis direction.

In this embodiment, a moving member that includes each vibrator, each vibrator holding frame, the pressing intermediary member 209, the tension coil springs 210, each press plate, each coupling metal sheet, and the felt 214 moves along the x-axis relative to the friction member 207. The first vibrator 2_1 and the second vibrator 2_1, the first vibrator holding frame 208_1 and the second vibrator holding frame 208_2, and the first coupling metal sheet 212_1 and the second coupling metal sheet 212_2 are common components.

Next follows a description of the degrees of the freedom of the motions in the first vibrator 2_1 and the second vibrator 2_2 according to this embodiment. FIGS. 15A to 15C are explanatory views of the degree of freedom of the motions in the second vibrator 2_2. In FIGS. 15A to 15C, a component of the motor unit 1000B unnecessary for the description will be omitted.

FIG. 15A illustrates the second vibrator holding frame 208_2 and the base member 205 integrated via the second coupling metal sheet 212_2 and the integration spring 215. A reference ball 217_2 is held between a conical hole part 212a_2 formed in the second coupling metal sheet 212_2 and a conical hole part 205a_2 formed in the base member 205. A ball 218_2 is held between a plane part 208a_2 of the second vibrator holding frame 208_2 and the conical hole part 205b_2 formed in the base member 205. Since the ball 218_2 is held between the plane part 208b_2 and the conical hole part 205c_2, the second vibrator holding frame 208_2 is restricted from rotating around the reference ball 217_2 relative to the base member 205.

FIG. 15B is a sectional view of the motor unit 1000B severed by a setting center plane of the integration spring 215, the reference ball 217_2, and the ball 218_2. Each of the arrows A, B, and C indicates a force applied to the second vibrator holding frame 208_2. The force expressed by the arrow A (coupling force vector) is a force applied by the integration spring 215 to the second vibrator holding frame 208_2 so as to rotate the second vibrator holding frame 208_2 around the reference ball 217_2 as a center in the rotating direction (yaw direction) around the y-axis. The force expressed by the arrow B (reaction vector) is a force applied by the ball 218_2 to the second vibrator holding frame 208_2. As described above, since the ball 218_2 is held between the plane part 208b_2 and the conical hole part 205c_2, the second vibrator holding frame 208_2 is restricted from rotating around the reference ball 217_2 relative to the base member 205. Hence, the second vibrator holding frame 208_2 is restricted from rotating in the yaw direction. At this time, a moment by the force A around the reference ball 217_2 as a center and a moment by the force B around the reference ball 217_2 as a center are balanced with each other.

The force C is a force (reaction vector) applied to the vibrator holding frame 208_2 via the second coupling metal sheet 212_2, but as illustrated in FIG. 15C, is balanced with the resultant force of the forces A and B. Hence, the second vibrator holding frame 208_2 is restricted from moving in the x-axis direction (x-axis translation direction) and in the z-axis direction (z-axis translation direction). In addition, since the reference ball 217_2 is held between the conical hole parts 212a_2 and 205a_2, the second vibrator holding frame 208_2 is also restricted from moving in the y-axis direction (y-axis translation direction).

As described above, in this embodiment, the second vibrator holding frame 208_2 integrated with the second vibrator 2_2 has two moving degrees of freedom in the rotating direction around the x-axis direction (roll direction) and in the rotating direction around the z-axis direction (pitch direction) relative to the base member 205. Since the second vibrator 2_2 has moving degrees of freedom in the roll direction and in the pitch direction in this embodiment, the protruding parts 2a_2 and 2b_2 in the second vibrator 2_2 can be surely brought into contact with the friction member 207_2 in the friction member 207. The forces A to C for restricting the vibrator 2 from moving are balanced with one another on one plane, and do not apply unbalanced, unnecessary forces to the protruding parts 2a_2 and 2b_2. Rotations of the second vibrator holding frame 208_2 around the reference ball 217_2 relative to the base member 205 are similar to those of the vibrator holding frame 8 illustrated in FIGS. 6D and 6E in the roll direction and the pitch direction around the reference ball 17 as a center in the first embodiment.

Although unillustrated in FIGS. 15A to 15C, the first vibrator 2_1, the first vibrator holding frame 208_1, and the first coupling metal sheet 212_1 are arranged as if the second vibrator 2_2, the second vibrator holding frame 208_2, and the second coupling metal sheet 212_2 are rotated by 180° around the z-axis as a center. The reference ball 217_1 is held between the conical hole part formed in the first coupling metal sheet 212_1 and the conical hole part 205a_1 formed in the base member 205. In addition, the ball 218_1 is held between the plane part 208a_1 of the first vibrator holding frame 208_1 and the conical hole part 205b_1 formed in the base member 205. Moreover, the reference balls 217_1 and 217_2 are arranged on the same section illustrated in FIG. 15B. Hence, in this embodiment, the first vibrator holding frame 208_1 integrated with the first vibrator 2_1 relative to the base member 205 has two moving degrees in the roll direction and in the pitch direction. Since the first vibrator 2_1 has moving degrees of freedom in the roll direction and in the pitch direction in this embodiment, the protruding parts 2a_1 and 2b_1 of the first vibrator 2_1 can be surely brought into contact with the first contact surface 207_1 in the friction member 207.

This embodiment can simultaneously drive the first vibrator 2_1 and the second vibrator 2_2 for holding the friction member 207, and generate a thrust larger than that with a single vibrator. Although it is necessary to adjust a force of the integration spring 215 in accordance with the generated thrust, the integration spring 215 serving as the tension coil spring can save a space and increase a force setting flexibility in comparison with the flat spring etc. In addition, since the press forces applied by the tension coil springs 210 that brings each vibrator into contact with the friction member 207 are balanced with each other via the friction member 207, this embodiment needs no linear guide part configured to guide a smooth movement under the pressing force as described in the first and second embodiments.

Figure 16:
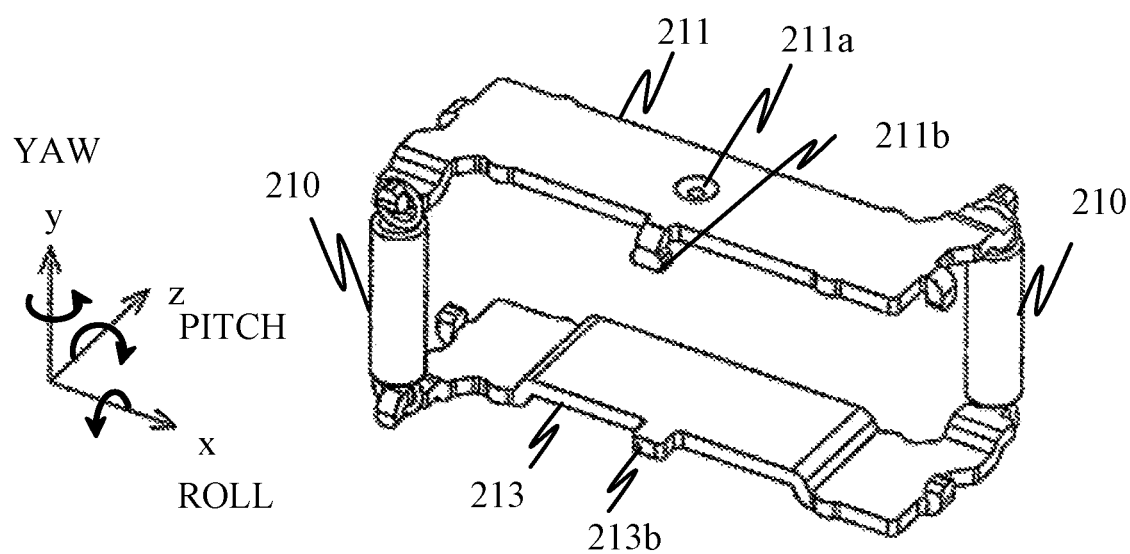
FIG. 16 is an explanatory view of a relationship between a first press plate and a second press plate according to the second embodiment.

FIG. 16 is an explanatory view of a relationship between the first press plate 211 and the second press plate 213. Two tension coil springs 210 are engaged with spring engagement parts in the first and second press plate 211 and 213. Since an interval between the first and second press plate 211 and 213 in the y-axis direction is determined by the components in the unillustrated motor unit 1000B, the two tension coil springs 210 force the first and second press plates 211 and 213. The two tension coil springs 210 are springs of the same type diagonally arranged with respect to the spherical projection 211a. However, the tension coil springs with a predetermined length do not always provide equal forces due to the manufacturing scattering, and the positions of the spring engagement parts in the first and second press plates 211 and 213 are different due to a manufacturing precision of a single component or the manufacturing errors of the intervening components. In this embodiment, the first press plate 211 contacts the pressing intervening member 209 via the spherical projection 211a, and can move (incline) in the roll direction and in pitch direction around the spherical projection 211a as a fulcrum. In other words, the first press plate 211 can incline around an axis as a center orthogonal to the longitudinal symmetrical plane C in the lateral symmetrical plane D and an axis as a center orthogonal to the lateral symmetrical plane D in the longitudinal symmetrical plane C. A configuration that can incline around each exact axis as a center is not always necessary, and a configuration that can incline around an axis that shifts from each axis by several millimeters may be regarded as the configuration that can incline around each axis. For example, the shift by about ±0.2 mm is permissible although the shift breadth depends on the performance and usage. Therefore, the pressing forces applied by the two tension coil springs 210 from the spherical projection 211a to the protruding parts $2a\_1$ and $2b\_1$ via the pressing intermediary member 209 are optimized notwithstanding the manufacturing scattering. Since the second vibrator $2\_2$ receives the reaction from the second press plate 213, the optimized pressing forces are applied to the protruding parts $2a\_2$ and $2b\_2$.

The press plate 211 can move in the roll direction and in the pitch direction relative to the first and second vibrator holding frames $208\_1$ and $208\_2$. Hence, the orientation of the first press plate 211 is optimized irrespective of the inclinations and the inclination changes of the first and second vibrator holding frames 208-1 and $208\_2$. The pressing forces applied by the two tension coil springs 210 do not scatter and become stable.

A projection 211b provided to the first press plate 211 is engaged with a groove part $208c\_1$ formed in the first vibrator holding frame $208\_1$ illustrated in FIG. 12A. A projection 213b provided to the second press plate 213 is engaged with a groove part $208c\_2$ formed in the second vibrator holding frame $208\_2$ illustrated in FIG. 12B. Hence, the first and second press plates 211 and 213 are integrated in the x-axis direction via the first and second vibrator holding frames $208\_1$ and $208\_2$. Therefore, while the moving part moves along the x-axis, a positional relationship among the tension coil springs 210, the first press plate 211, and the second press plate 213 does not change and the pressing forces applied by the tension coil spring 210 becomes stable.

Figure 17A:
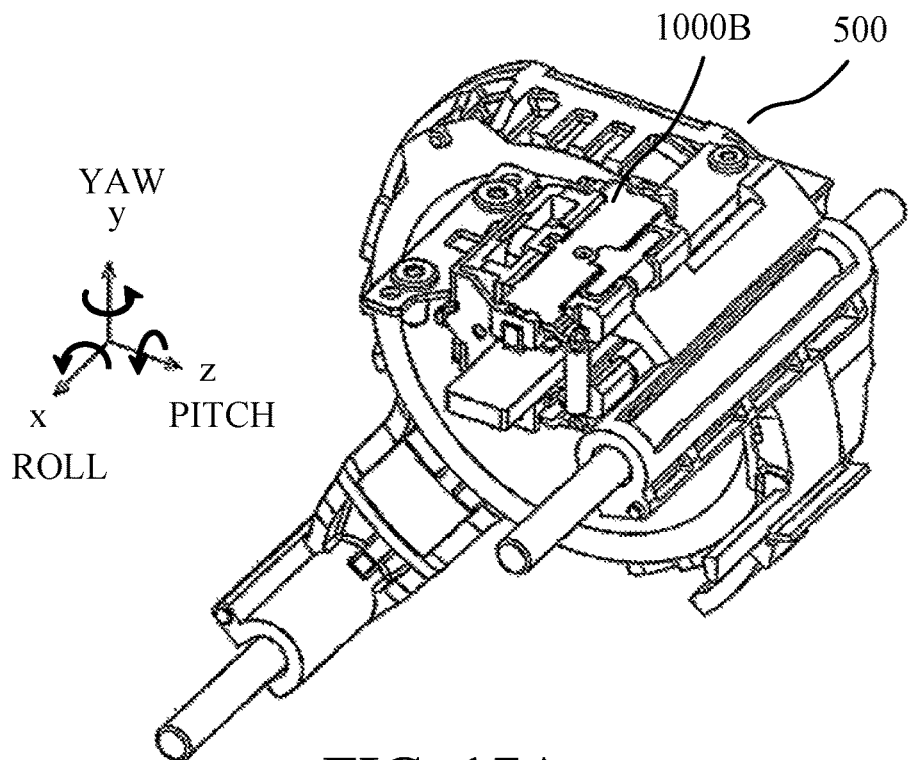
FIGS. 17A and 17B are perspective views of the lens driving unit according to the second embodiment.
Figure 17B:
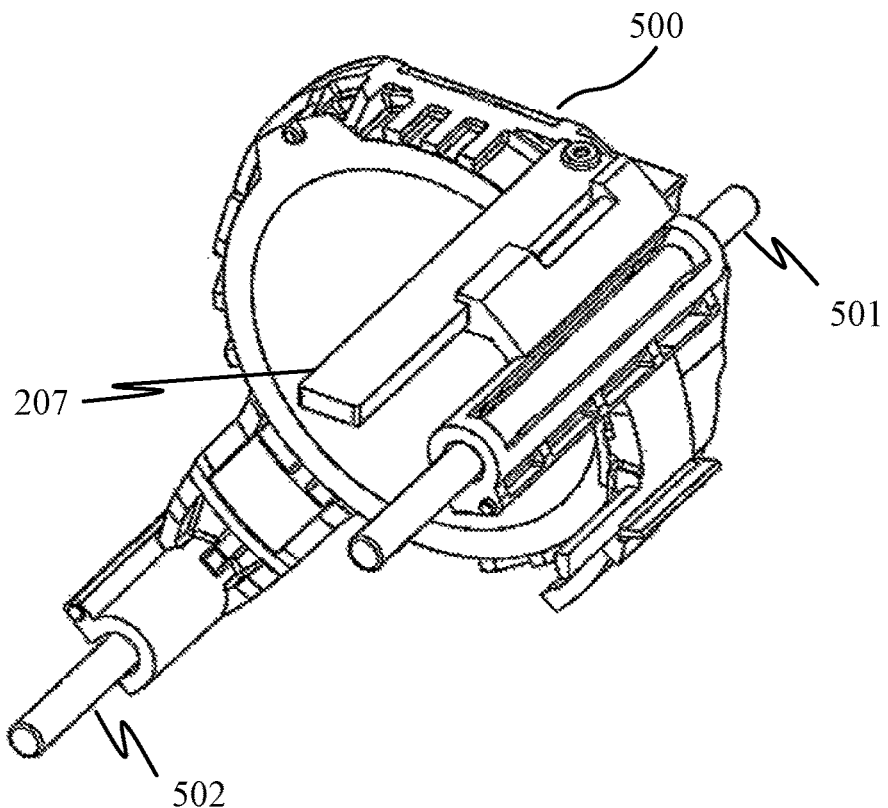

FIGS. 17A and 17B are perspective views of the lens driving unit. FIG. 17A is a perspective view of the lens driving unit to which the motor unit 1000B is attached. FIG. 17B is a perspective view of the lens driving unit from which the motor unit 1000B is detached. The lens unit 500 is movably supported along the optical axis (x-axis) by the bar-sleeve structure. Guide bars 501 and 502 are formed parallel to the x-axis, and supported by an unillustrated member. The friction member 207 provided to the motor unit 1000B is integrated with the lens unit 500 via the screws and adhesion etc., and the lens unit 500 receives the thrust and moves in the optical axis direction.

While the first embodiment provides four tension coil springs 110 and the second embodiment provides two tension coil springs 110, another number of tension coil springs may be used. The second embodiment may replace the engagement between the first press plate 211 and the second press plate 213 in the height direction with each other and may use the compression coil spring instead of the tension coil spring for the press member.

It can be regarded that each member exists on a certain plane in each embodiment, even when at least part of the member intersects the plane.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-248601, filed on Dec. 22, 2016, which is hereby incorporated by reference herein in its entirety.

What is claimed is:

1. A vibration-wave motor comprising:
   a vibrator having two protruding parts;
   a holding member configured to hold the vibrator;
   a movable member configured to translationally move together with the holding member;
   a rotating unit configured to allow the holding member to rotate around each of three axes relative to the movable member and to restrict the holding member from translating in each of the three axes relative to the movable member;
   an urging member configured to urge the holding member and the movable member so that the holding member and the movable member translationally move together; and
   a restricting unit configured to restrict the holding member from rotating around the rotating unit as a center by the urging member,
   wherein the restricting unit restricts the holding member from rotating about an axis orthogonal to a plane with which tips of the two protruding parts of the vibrator are in contact.

2. The vibration-wave motor according to claim 1, wherein a coupling force vector applied by the urging member to the holding member, a reaction vector applied by the restricting unit to the holding member, and a reaction vector applied by the rotating unit to the holding member are balanced with one another on the same plane.

3. The vibration-wave motor according to claim 1, wherein the rotating unit has a first rotation center part as a rotation center of the rotating unit and a first contact part that contacts the first rotation center part.

4. The vibration-wave motor according to claim 3, further comprising a coupling member integrated with the holding member,
   wherein the first contact part is provided at least one of the coupling member and the movable member.

5. The vibration-wave motor according to claim 4, wherein the first rotation center part is provided to one of the coupling member and the movable member.

6. The vibration-wave motor according to claim 1, wherein the urging member is a coil spring.

7. The vibration-wave motor according to claim 6, wherein the urging member is a tension coil spring.

8. The vibration-wave motor according to claim 1, wherein the vibrator includes a piezoelectric element that excites a vibration when receiving a voltage.

9. An apparatus comprising:
   a vibration-wave motor; and
   a member driven by a driving force from the vibration-wave motor,
   wherein the vibration-wave motor includes:
   a vibrator having two protruding parts;
   a holding member configured to hold the vibrator;
   a movable member configured to translationally move together with the holding member;
   a rotating unit configured to allow the holding member to rotate around each of three axes relative to the movable member and to restrict the holding member from translating in each of the three axes relative to the movable member;

an urging member configured to urge the holding member and the movable member so that the holding member and the movable member translationally move together; and a restricting unit configured to restrict the holding member from rotating around the rotating unit as a center by the urging member, and p1 wherein the restricting unit restricts the holding member from rotating about an axis orthogonal to a plane with which tips of the two protruding parts of the vibrator are in contact.

10. The apparatus according to claim 9, wherein the apparatus is an optical apparatus that includes a lens.

* * * * *